(12) United States Patent
Hidas et al.

(10) Patent No.: US 12,514,766 B2
(45) Date of Patent: Jan. 6, 2026

(54) DEVICE AND METHOD FOR NAVIGATING AND/OR GUIDING THE PATH OF A VEHICLE, AND VEHICLE

(71) Applicant: MUNEVO GMBH, Munich (DE)

(72) Inventors: Claudiu Hidas, Munich (DE); Aashish Trivedi, Munich (DE); Deepesh Pandey, Munich (DE); Konstantin Madaus, Munich (DE)

(73) Assignee: MUNEVO GMBH, Munich (DE)

( * ) Notice: Subject to any disclaimer, the term of this patent is extended or adjusted under 35 U.S.C. 154(b) by 315 days.

(21) Appl. No.: 18/039,460

(22) PCT Filed: Jan. 27, 2021

(86) PCT No.: PCT/EP2021/081242
§ 371 (c)(1),
(2) Date: May 30, 2023

(87) PCT Pub. No.: WO2022/117298
PCT Pub. Date: Jun. 9, 2022

(65) Prior Publication Data
US 2024/0016677 A1    Jan. 18, 2024

(30) Foreign Application Priority Data

Dec. 1, 2020   (DE) .......................... 102020131845.6

(51) Int. Cl.
*A61G 5/04* (2013.01)
*G16H 40/67* (2018.01)

(52) U.S. Cl.
CPC .............. *A61G 5/04* (2013.01); *G16H 40/67* (2018.01); *A61G 2203/12* (2013.01);
(Continued)

(58) Field of Classification Search
None
See application file for complete search history.

(56) References Cited

U.S. PATENT DOCUMENTS 4,407,393 A    10/1983  Youdin et al.
8,502,641 B2 *  8/2013  Lautzenhiser ......... G05B 11/42
                                                     340/4.11
(Continued)

FOREIGN PATENT DOCUMENTS

CN      105534648 A    5/2016
EP      3 076 906 B1   7/2018
(Continued)

OTHER PUBLICATIONS

International Search Report and Written Opinion for Application No. PCT/EP2021/081242, dated Feb. 24, 2022.
(Continued)

*Primary Examiner* — Peter D Nolan
*Assistant Examiner* — Jacob Kent Besteman-Street
(74) *Attorney, Agent, or Firm* — MARSHALL, GERSTEIN & BORUN LLP

(57) ABSTRACT

The invention relates to a device (80) and to a method for navigating and/or guiding the path of a vehicle (200), in particular of a wheelchair, and to a vehicle, in order to achieve increased safety and comfort during operation of the vehicle. The device (80) comprises at least one first sensor, in particular an inertial navigation unit (11), which is designed and arranged so as to detect at least one first body part, in particular an absolute position and/or position and/or rotation and/or translation, of a passenger of the vehicle (200) and to output first sensor signals (S1), and a second sensor, in particular an image-based sensor (21, 22), which is designed and arranged so as to detect at least the first body part of the passenger and/or its features and to output second sensor signals (S2). A control unit (100) receives the sensor signals (S1, S2), ascertains first control signals (ST1) based on the first sensor signals (S1), and it is ascertained, based on the second sensor signals (S2), whether the first control
(Continued)

signals (ST1) comply with at least first reliability criteria. A safety mode is adopted when the first reliability criteria are not complied with.

19 Claims, 9 Drawing Sheets

(52) U.S. Cl.
CPC ...... *A61G 2203/18* (2013.01); *A61G 2203/36* (2013.01); *A61G 2203/42* (2013.01); *A61G 2203/70* (2013.01)

(56) References Cited

U.S. PATENT DOCUMENTS

| | | | |
|---|---|---|---|
| 9,342,144 B1 | 5/2016 | Lautzenhiser | |
| 11,687,073 B2* | 6/2023 | Hidas | G05D 1/0016 |
| | | | 701/2 |
| 2012/0136666 A1* | 5/2012 | Corpier | A61G 5/024 |
| | | | 704/E11.001 |
| 2012/0143400 A1* | 6/2012 | Hinkel, III | B62D 1/00 |
| | | | 701/2 |
| 2017/0042439 A1 | 2/2017 | Yeow et al. | |
| 2017/0189250 A1* | 7/2017 | Juhasz | A61G 5/043 |
| 2017/0216115 A1* | 8/2017 | Parker | A61G 5/122 |
| 2017/0266069 A1 | 9/2017 | Lozano et al. | |
| 2018/0352959 A1* | 12/2018 | Zhang | A47C 1/03 |
| 2018/0364810 A1* | 12/2018 | Parshionikar | G06F 3/013 |
| 2019/0049968 A1 | 2/2019 | Dean et al. | |
| 2020/0222219 A1 | 7/2020 | Saito et al. | |

FOREIGN PATENT DOCUMENTS

| | | |
|---|---|---|
| EP | 3 646 127 A1 | 5/2020 |
| IN | 00554CH2014 A | 8/2015 |
| WO | WO-01/67537 A1 | 9/2001 |
| WO | WO-2016/049583 | 3/2016 |
| WO | WO-2016/049583 A1 | 3/2016 |
| WO | WO-2019/002597 A1 | 1/2019 |

OTHER PUBLICATIONS

Office Action for German Application No. 102020131845.6, dated Jun. 21, 2021.

* cited by examiner

DEVICE AND METHOD FOR NAVIGATING AND/OR GUIDING THE PATH OF A VEHICLE, AND VEHICLE

The invention relates to a device and a method for navigating and/or guiding the path of a vehicle, in particular a wheelchair, and to a vehicle.

A special wheelchair control system for an electric wheelchair is known from EP 3 646 127. This comprises an input element, for example data glasses attached to the head of a passenger, and an adapter box for transmitting the data from the input element to an input/output module of the electric wheelchair. To generate travel commands, head movements of a passenger are detected by motion-detecting sensors when the data glasses are used and assigned to desired travel directions and travel speeds. Control signals generated on the basis of the travel commands are transmitted to the input/output module of the wheelchair in order to control the wheelchair.

EP 3 076 906 relates to a control unit for a personal vehicle. The control unit is able to provide a control signal for the vehicle with the aid of two independent motion sensors by evaluating the determined relative orientations of the independent motion sensors to each other. As a result, a desired driving command from the passenger can be detected even in the presence of disturbance variables, such as inclines, declines, or unpaved roads. If the evaluation of the orientation sensors identifies already known gestures, these are used as vehicle control signal. Additional, external sensors can be used to configure and determine the position and attitude of the vehicle.

The described prior art is problematic in many respects. It is true that in many cases motion-based or orientation-based control can be performed using data from at least a first motion sensor. Also, some embodiments allow detection of motion patterns to initiate, for example, an emergency stop, emergency call, or launch of external applications. However, a failure of the first motion sensor may already lead to a failure of the vehicle control system. For example, in a vehicle control system based purely on head orientation, even a cramp or short-term stiffening of the neck can lead to a loss of control by the passenger. Control commands not desired by the passenger, for example triggered by errors in the first motion sensor, can also be passed on to the actuators of the vehicle and set it in motion or leave it in motion.

Based on this prior art, it is the object of the present invention to provide a device and a method which creates increased safety as well as increased comfort during the operation of a vehicle. In particular, increased fail-safety is to be made possible, the transmission of undesired control commands to the vehicle is to be avoided and the comfort during use of the vehicle is to be improved. The object is solved by the device according to claim 1, the vehicle according to claim 15 and the method according to claim 16.

The object is solved in particular by a device for navigating and/or guiding the path of a vehicle, in particular a wheelchair, wherein the device comprises at least:

a first sensor, in particular an inertial navigation sensor, which is designed and arranged to detect at least one first body part, in particular a position and/or rotation and/or translation, of a passenger of the vehicle and to output first sensor signals;

a second sensor, in particular an image-based sensor, which is designed and arranged to detect at least the first body part of the passenger and/or their features, in particular their absolute position and/or position and/or rotation and/or translation, and to output second sensor signals;

a control unit which is designed to receive the first and second sensor signals, determine first control signals for controlling the vehicle based at least on the first sensor signals, determine whether the first control signals meet at least first reliability criteria based at least on the second sensor signals, and adopt a safety mode if the control unit determines that the first control signals do not meet at least the first reliability criteria.

One idea of the invention arises from the fact that every sensor is subject to a rate of error or failure that cannot be completely eliminated. In this regard, it is particularly advantageous in applications where there are significant, negative effects of sensor failure to provide suitable measures for dealing with sensor failures. The present invention addresses this circumstance by not directly using first sensor signals from at least a first sensor to determine a control signal for the vehicle, but instead using at least second sensor signals, in particular image-based sensor signals, from a second sensor to determine at least the first reliability criteria, such that a safety mode is adopted if at least first control signals determined using the first sensor signal do not meet the first reliability criteria.

A safety mode can be understood as a restricted operating range of the device, wherein the scope of restriction is determined on the one hand based on sensor-detectable, physical states of a passenger. On the other hand, reduced accuracy and/or reliability of the sensors and actuators used by the device can also lead to a restriction of the operating range of the device, e.g. driving at reduced speed.

The reliability criteria are intended to define thresholds above which the safety mode, i.e. the restricted operating range of the device, must be adopted. With respect to the detectable, physical states of the passenger, the thresholds may be general thresholds or individualized thresholds. Individualized thresholds may be necessary if the externally perceptible expressions of physical states, facial expressions or gestures, of a passenger are significantly restricted. This may be the case, for example, in the event of (partial) paralysis of a body part, such as the face. In this case, it is possible that thresholds are learned by the device by repeating certain facial expressions or gestures several times. It is also possible for thresholds to be adapted during operation of the device, for example if it is known that a passenger usually begins to tremble during prolonged operation of the vehicle as a result of general exertion.

The reliability criteria can also define thresholds for the required accuracy and/or reliability of individual sensors. In addition, permissible tolerances in the deviations of the same physical parameters, determined by different sensors, can be defined. An example of this is the permissible position deviation of the iris in an eye-feature-based control of the vehicle, in which two different sensors detect the passenger's eye.

Using at least the second sensor signals, conclusions can be made as to whether the passenger is capable of controlling the vehicle. How to decide whether a passenger is capable of controlling the vehicle depends on the chosen embodiment of the present invention. It is possible to determine whether the passenger is able to control the vehicle by comparing the second sensor signals with predefined first reliability criteria.

For example, in the case of a passenger, at least the second sensor can detect a strong tilt of the head to one side over a longer period of time as a result of progressively decreasing neck muscle strength. With head-orientation-based control applied, this could result in a potentially dangerous circular motion ride. In such a case, the safety mode can adjust the permissible operating range of the device so that the vehicle brakes to a standstill by outputting a second control signal.

Braking to a standstill is a possible measure influencing driving dynamics in response to physical states that can be detected by sensors.

It is also possible to determine a safe stopping position before the vehicle stops using advanced sensors for position determination or an environment-sensing sensor assembly and to control this stopping position. Here, too, the device generates second control signals that are not the same as the first control signals.

The first or second control signals may be control signals that influence driving dynamics and are transmitted to vehicle actuators. According to the invention, it is also possible that the control signals provide data for device or passenger monitoring or choices for vehicle modes to be adopted to a wearable computer system (wearable) or a passenger's cell phone. The control signals can also be designed for forwarding to a remotely located computer system (backend) for remote device or passenger monitoring.

In safety mode, the device allows the operating range to be adjusted so that an emergency mode is initiated. This allows predetermined individuals to be notified of the initiated safety mode. If required, the sensed physical conditions of the passenger can also be transmitted, for example to perform a human diagnosis of the passenger's physical conditions from a distance.

Also, a safety mode may be initiated due to insufficient sensor capability. It is conceivable that one or more of the sensors may provide their own accuracy or reliability analysis data to the control unit, whereupon the one or more sensors may not be used to determine the first control signals or reliability criteria.

When first control signals or second control signals classified as valid are generated by the device, they are transmitted to vehicle actuators, in particular controllable motors, wherein the vehicle actuators are arranged to drive the vehicle and are designed to receive and process the control signals from the device.

According to the invention, a first body part may be any body part of the human body capable of performing movements.

In one embodiment, the first body part is the passenger's head. In this embodiment, the device comprises as a first sensor an inertial navigation unit, arranged on or in the wearable computer system (wearable), which is designed to detect at least the head, in particular an absolute position and/or position and/or rotation and/or translation, and to output first sensor signals.

The second sensor detecting the passenger's head may be an image-based sensor, such as an image-based front sensor or an image-based rear sensor of a cell phone. However, it may also be an additional image-based sensor attached to the vehicle that detects the passenger's head. The control unit may be configured to receive the first and second sensor signals and determine first control signals for controlling the vehicle based on the first sensor signals.

Based on the second sensor signals, it can be determined whether the first control signals meet at least first reliability criteria. For this purpose, the first reliability criteria are determined based on the second sensor signals. The safety mode may be adopted if the control unit determines that the first control signals do not meet at least the first reliability criteria.

Basic data can be determined on the basis of the second sensor signals. These basic data can be geometric dimensions and/or size ratios and/or features of the face and/or gestures, wherein the first reliability criteria are determined using the basic data.

These geometrically or mathematically expressed properties of the basic data can characterize facial expressions perceivable by humans and allow conclusions to be drawn about the emotional state perceived by the passenger during operation of the vehicle. On the one hand, if there is a high probability of a state of happiness, a state of relaxation, or a similar state associated with positive mood on the part of the passenger, the first reliability criteria are said to be met. On the other hand, if there is a high probability of the passenger being anxious, in a state of surprise, in a state of fear, or in a similar state associated with a negative mood, the first reliability criteria shall mean a failure to meet the first reliability criteria.

According to the invention, the image-based analysis can also detect redness, enlargement or reduction of the eyes, including the pupils, as well as the opening or closing of the eyes or the mouth and lips, including inferable characteristics such as shortness of breath, increased pulse or increasing, dangerous, physical exertion of the person. Detection of such physical conditions also means failure to meet the first reliability criteria.

In addition, first reliability criteria may not be met if the first control signals detect control commands from the passenger that conflict with at least the second sensor signals, i.e. one sensor determines a desired travel to the left, while at least one other sensor determines a desired travel to the right.

If the first reliability criteria are not met, the safety mode is initiated. According to the invention, it is consequently possible not to transmit an already generated control signal to vehicle actuators responsible for vehicle control due to the violation of first reliability criteria. This arrangement can ensure that obviously recognizable, critical physical conditions of the passenger are detected, the vehicle is stopped and/or an emergency call mode downstream of the safety mode enables rapid assistance for the passenger by contacting an emergency contact. In addition, third parties and the passenger cannot be further physically harmed as a result.

In one embodiment, the control unit is (further) configured to determine the first control signals in addition to the first sensor signals of the inertial navigation unit attached to or in the wearable using also the second sensor signals of the image-based sensor. In this case, the safety mode is adopted if the first or the second reliability criteria are not met. In this embodiment, the second reliability criteria are based on accuracy and/or reliability analysis of at least the first and the second sensor signals.

Accuracy and/or reliability analysis can be performed using sensor self-diagnostic data provided with the sensor signals.

The accuracy and/or reliability analysis may further be determined using the first and second sensor signals, respectively, of one or more of the features of absolute position and/or position and/or rotation and/or translation of the passenger's head, and based on their matching, the reliability of the two sensors may be estimated.

If the matching of the feature or features used to control the vehicle matches within a predefined tolerance or predefined tolerances, the feature values of the inertial navigation unit are used to determine the first control signal. If one or more of the tolerances are exceeded, self-diagnostic data from the image-based sensor is used, and if the reliability is poor, for example due to poor image quality, a signal about the poor reliability is communicated to the passenger via the wearable or to the passenger's cell phone. Generating control signals based on the first sensor signals is further enabled. If the image-based sensor is sufficiently reliable, a safety mode is again initiated, because the control unit assumes a failure of the inertial navigation unit. In this case, the safety mode initiates an immediate stop. Continuous analysis of the sensors enables safe operation of the vehicle and immediate action is taken to minimize the consequences of damage in the event of sensor faults.

In a further embodiment, the fulfillment of the first reliability criteria is determined by implementing machine learning, in particular by classification, preferably by a support vector machine (SVM), or by implementing a neural network, in particular a convolutional neural network (CNN). The embodiment has the advantage of the individual classifiability of the image-based face recognition to the specific passenger. Furthermore, the aforementioned artificial intelligence means generally achieve better hit rates in the field of image-based face recognition and are more reliable than conventional classification methods, for example decision trees.

For these artificial intelligence approaches, it is necessary to provide pre-labeled image data, in particular image data with associated person facial expressions, for classification of the expressed mood of the passenger. This labeled image data can be an image data set of arbitrarily selected persons, an individual image data set of the passenger, or a mixed image data set.

In a further embodiment, a third sensor, in particular a vitality data sensor, is arranged on a body part or between two body parts to detect vitality parameters, in particular heart rates, of the passenger and to output third sensor signals. The control unit receives the third sensor signals, wherein if a vitality parameter value range is not met by the third sensor signals, the second reliability criteria are not met. As a result, the safety mode is adopted.

Since vitality parameters can be recorded on any part of the human body, the body part to which the vitality data sensor is attached can be any part of the body. In particular, an arrangement on the neck, in the ear, around the wrist, around the chest or around the abdomen is preferable.

Also, the vitality data sensor may be a two-part sensor, such as a chest strap and a wrist transmission unit.

Vitality data, moreover, are not limited to heart rates. Continuous monitoring of blood pressure, endogenous blood oxygen content, blood count, blood glucose, saliva or other endogenous parameters that can be measured directly or indirectly by the vitality data sensor can also be made possible.

In a further embodiment, instead of the inertial navigation unit, the first sensor is an eye feature detection unit. This is attached to or in the wearable and is designed to detect at least one eye of the passenger and/or its features, in particular the absolute position and/or position and/or rotation and/or translation. The eye feature detection unit may output first sensor signals, wherein the control unit receives the first sensor signals and determines the first control signals for controlling the vehicle using the first sensor signals. The eye feature detection unit may be an RGB image-based eye feature detection unit or an infrared light-based eye feature detection unit.

By analyzing the accuracy and/or reliability of the first sensor signals of the eye feature detection unit and the second sensor signals of the image-based sensor, it is possible to check whether the second reliability criteria are met. In particular, the control unit must determine whether deviations between the first and second sensor signals detecting the eye features are detectable.

A deviation of one or more of the features relevant for the generation of first control signals absolute position and/or position and/or rotation and/or translation of at least one eye of the passenger must be within the permissible deviations or tolerances of the second reliability criteria.

If one or more of the tolerances are exceeded, self-diagnostic data from the image-based sensor is relied upon, and if the reliability is poor, for example due to poor image quality, a poor reliability signal is transmitted to the passenger on the wearable or on the passenger's cell phone. Generating first control signals based on the first sensor signals is further enabled.

If tolerances are not met despite sufficient reliability of the image-based sensor, a safety mode is initiated because the control unit assumes errors in the eye feature detection unit. The safety mode is initiated and at least causes the vehicle to stop.

Continuous analysis of the sensors enables safe operation of the vehicle and immediate action is taken to minimize the consequences of damage in the event of sensor faults. Safety is further enhanced by the third sensor, the vitality data sensor. This is because unless the third sensor signals meet a vitality parameter value range, the second reliability criteria are not met.

In one embodiment, the first sensor is a speech input sensor attached to a head-hold mechanism, a wearable, or the vehicle to provide speech input to the passenger. The speech input sensor is configured to output first sensor signals, wherein the control unit receives the first sensor signals and determines the first control signals for controlling the vehicle using the first sensor signals.

The control unit is designed to use an implementation of neural networks, preferably recurrent neural networks (RNN), for example an LSTM or a GRU, or convolutional neural networks (CNN) when processing the first sensor signals to determine the first control signals. In particular, for passengers with limited speech capabilities, self-learning neural networks allow speech recognition to be adapted to the passenger's voice. On the one hand, the control commands given by speech input can result in first control signals for (starting) or stopping the vehicle. On the other hand, voice inputs can be used to operate a menu navigation, which can be displayed to the passenger by the wearable by projecting a head-up display. This allows further commands to be issued, for example to open doors, order elevators, press buttons, operate switches or other external applications.

The control unit is further designed to determine the first control signals in addition to the first sensor signals of the speech input sensor using also second sensor signals of a second sensor, preferably an image-based sensor. In this case, the second sensor is directed at the passenger's head and is designed to detect features of the absolute position and/or position and/or rotation and/or translation of one or both eyes and to output the second sensor signals.

As a third sensor, the vitality data sensor is arranged on a body part or between two body parts to detect vitality parameters, in particular heart rates, of the passenger and output third sensor signals. The control unit receives and processes the third sensor signals, and if a vitality parameter value range is not met by the third sensor signals, the second reliability criteria are not met. The safety mode is adopted.

An eye feature detection unit, attached to or in the wearable, is used as the fourth sensor. Like the second sensor, this is designed to detect at least one eye of the passenger and/or its features, in particular its absolute position and/or position and/or rotation and/or translation, and to output fourth sensor signals, wherein the control unit receives the fourth control signals and uses them to determine the first control signals for controlling the vehicle. The eye feature detection unit may be an RGB image-based eye feature detection unit or an infrared light-based eye feature detection unit. Consequently, in this embodiment, the first, second, and fourth sensor signals are used to determine the first control signals.

This results in a redundant system, with the use of an infrared light-based eye feature detection unit resulting in diversitary redundancy in eye feature detection by the second and fourth sensors. The safety mode is adopted in this embodiment when the first or second reliability criteria are not met.

The control unit can determine basic data using the second sensor signals. This basic data can be geometric dimensions and/or size ratios and/or features of the face and/or gestures, wherein the first reliability criteria are determined using the basic data.

These properties of the basic data, expressed geometrically or mathematically, characterize the facial expressions that can be perceived by humans and allow conclusions to be drawn about the emotional state perceived by the passenger during the operation of the vehicle. On the one hand, if there is a high probability of a state of happiness, a state of relaxation, or a similar state associated with positive mood on the part of the passenger, the first reliability criteria are said to be met. On the other hand, if there is a high probability of the passenger being anxious, in a state of surprise, in a state of fear, or in a similar state associated with a negative mood, the first reliability criteria shall mean a failure to meet the first reliability criteria.

It is also possible that when positive sentiment is detected, feedback occurs within the control unit and the control unit starts a recording mode. In this case, at least the passenger's head movements detected by the second, image-based sensor are recorded and used to train a machine learning algorithm in order to recognize the passenger's learned gestures at a later time and to be able to interpret them as control commands. For example, one such gesture might be a quick shake of the head to trigger the vehicle to stop. This form of gesture recognition makes the use of the vehicle more personalized for the passenger.

The fulfillment of the first reliability criteria is checked by implementing machine learning, in particular by classification, preferably by a support vector machine (SVM), or by implementing a neural network, in particular a convolutional neural network (CNN). At least when using CNNs, probabilities for the recognized facial expressions are also evaluated by the control unit to determine whether the first reliability criteria are met.

Both machine learning methods and neural network implementations are based on image-based, labeled training data, which includes image data of faces or facial features. Also, this training data may include images of the passenger's face. This allows the adaptability of the facial expression detection algorithm to the specific passenger.

According to the invention, the image-based analysis can also detect redness, enlargement or reduction of the eyes, including the pupils, as well as the opening or closing of the eyes or mouth and lips, including inferable characteristics such as shortness of breath, increased pulse or increasing, dangerous exertion of the person. Detection of such physical conditions also means failure to meet the first reliability criteria.

In this embodiment, the second reliability criteria are based on accuracy and/or reliability analysis of the first, second, and fourth sensor signals. In particular, an accuracy comparison of the detected eye or iris features of the second, image-based sensor with those of the fourth sensor, the eye feature detection unit, is performed.

Based on the accuracy and/or reliability analysis of the second sensor signals of the image-based sensor and the fourth sensor signals of the eye feature detection unit, the control unit can check whether the deviation of one or more of the features absolute position and/or position and/or rotation and/or translation of the passenger's eye is within one or more tolerances.

Should one or more of the tolerances be exceeded, self-diagnostic data from the image-based sensor is relied upon, and in the event of poor reliability, for example due to poor image quality, a signal of poor reliability is transmitted to the passenger via the wearable or to their cell phone. The generation of control commands based on the fourth sensor signals is further enabled.

Unless a low reliability of the second, image-based, sensor can be determined when one or more of the tolerances is exceeded, the safety mode is adopted and the vehicle is at least stopped. The reason for this is that if the reliability of the second sensor is sufficient, the control unit assumes that there is an error in the eye feature detection unit.

If the first and second reliability criteria are not violated, eye-feature-based control of the vehicle can be started by assuming an initial state, such as fixing a point in the center of the pair of eyes. Also, a sequence of gestures, for example, blinking the eyes three times or certain predefined eye movement patterns, may signify the start of eye-feature-based control. Also, the first speech input sensor can be used to detect a start command.

Control is then performed by assigning a gaze direction to the desired direction of movement. The vehicle can be stopped by detecting a predefined gesture, such as closing the eyes, or blinking the eyes, from the second sensor or the fourth sensor. Also, the vehicle can be brought to a stop by voice input using the first sensor, the voice input sensor.

Continuous analysis of the sensors enables safe operation of the vehicle and immediate action is taken to minimize the consequences of damage in the event of sensor faults. Safety is also enhanced by the use of the third sensor, the vitality data sensor, because unless the third sensor signals meet a vitality parameter value range, the second reliability criteria are not met. The safety mode is adopted.

In one embodiment, a fifth sensor, a brain-control unit interface or input device, is arranged on and/or in the passenger's head instead of the fourth sensor, the eye feature detection unit. This is designed to output fifth sensor signals, with the control unit receiving the fifth sensor signals and using them to determine the first control signals for controlling the vehicle. The brain-control unit interface is used as the primary data source for generating the first control signals. Further, the image-based sensor is used to determine at least the first reliability criteria, and if the first reliability criteria are not met, the safety mode is initiated.

Predefined control commands are associated with the fifth control signals in the control unit, such that a passenger thought detected by the fifth sensor signals is associated with a desired control command. Furthermore, abstract thought patterns of the passenger detected in the fifth sensor signals can be provided to a machine learning algorithm in the control unit, wherein the learning algorithm learns from the provided data and determines the first control signals based on detected control commands of the passenger.

Furthermore, however, the signals can also be used to determine whether the passenger has panicked, for example, because he or she is in a dangerous physical condition.

By combining with the first speech input sensor, the second image-based sensor, and the third sensor of this embodiment, the vitality data sensor, dangerous situations can be classified more easily and driving the vehicle becomes safer.

In one embodiment, all previously used sensors are combined for providing an even safer and more reliable solution. As a first sensor, the inertial navigation unit, mounted on or in the wearable, is used to detect the absolute position and/or position and/or rotation and/or translation of the passenger's head and to transmit first sensor signals to the control unit and, using them, to determine the first control signals for controlling the vehicle. The second, image-based, sensor can detect the passenger's head and transmit second sensor signals to the control unit, using which the first reliability criteria are determined and the first control signals for controlling the vehicle are determined.

A third sensor, the vitality data sensor, transmits third sensor signals to the control unit. These describe vitality parameters, in particular heart rates, of the passenger, wherein the second reliability criteria are not met if the third sensor signals do not comply with a vitality parameter value range.

As a fourth sensor, an eye feature detection unit is used, attached to or in the wearable, and designed to detect one or both eyes of the passenger, in particular their absolute position and/or position and/or rotation and/or translation of the passenger, and to output fourth sensor signals, wherein the control unit receives the fourth sensor signals and, using them, determines the first control signals for controlling the vehicle.

Based on the accuracy and/or reliability analysis of the first sensor signals of the inertial navigation unit and the second sensor signals of the image-based sensor, the control unit can check whether the deviation of one or more of the features absolute position and/or position and/or rotation and/or translation of the passenger's head is within one or more tolerances.

Based on the accuracy and/or reliability analysis of the second sensor signals of the image-based sensor and the fourth sensor signals of the eye feature detection unit, the control unit can check whether the deviation of one or more of the features absolute position and/or position and/or rotation and/or translation of the eye or eyes of the passenger is within one or more tolerances.

The fifth sensor, in particular the brain-control unit interface or input device, is arranged on and/or in the passenger's head and is designed to output fifth sensor signals, wherein the control unit receives the fifth sensor signals and determines the first control signals for controlling the vehicle using them. The fifth sensor signals may include control commands from the passenger to start and stop.

The sixth sensor used is the voice input sensor, which can in particular be a head-hold mechanism voice input sensor, a wearable voice input sensor, or a vehicle voice input sensor and can be designed to output sixth sensor signals, wherein the control unit receives the sixth sensor signals and uses them to determine the first control signals for controlling the vehicle. Through the voice input sensor, passenger commands for starting or stopping the vehicle can be transmitted to the control unit by the sixth sensor signals.

If one or more of the tolerances are not met, the second reliability criteria are not met. If the first or second reliability criteria are not met, the device adopts safety mode.

If the reliability criteria are met, first control signals for moving the vehicle can be transmitted from the control unit to the vehicle actuator. The fourth sensor signals define the direction of travel as part of the first control signals, while the first sensor signals define the desired speed in the direction of travel.

In a further embodiment, a first environment-sensing sensor assembly, in particular an ultrasonic sensor assembly and/or a LIDAR sensor assembly and/or an image-based sensor assembly and/or a RADAR sensor assembly, is also attached to the vehicle for sensing the environment and is configured to output first sensor assembly signals, wherein the control unit receives first sensor assembly signals and determines the first control signals using them.

The environment can also be sensed by an image-based rear sensor and/or a wearable image sensor, and corresponding sensor signals can be transmitted to the control unit. Using these, the control unit can determine the first control signals.

In this case, the recorded environmental information can be evaluated by the control unit and the safety mode can be adopted in the event of a critical approach to obstacles, slopes, inclines or similar.

In one embodiment, the wearable and/or a cell phone is configured and arranged to output seventh sensor signals, in particular passenger destination input sensor signals, wherein the control unit has previously transmitted available destination input selection data to the wearable and/or the cell phone for passenger destination input.

The destination input selection data is generated by evaluation of the sensor signals of at least the first environment-sensing sensor assembly by the control unit. The targets can basically be all elements whose contour can be detected by a RADAR and/or LIDAR and/or ultrasonic and/or image-based sensor assembly and which are in the passenger's field of view.

For image-based sensor data, trained convolutional neural networks (CNNs) can be used. The image-based training dataset required to train one or more CNNs includes a variety of different labeled image data captured indoors as well as outdoors by different cameras and under different lighting situations, so that the CNNs can recognize a variety of objects sensed by the environment-sensing sensor assembly and provide them to the passenger as destination input selection data.

Destination input selection data is projected into the passenger's field of view when the wearable is used, modeled on a head-up display. Cell phones allow a screen display. The control unit receives the seventh sensor signals and determines the first control signals using them.

The control unit has the task of calculating a trajectory to the destination, providing suitable first control signals and, during the journey to the destination, making adjustments to the trajectory based on the real-time data from the environment-sensing sensors, for example due to the changing environment, and providing adjusted first control signals.

When using LIDAR or RADAR sensor assemblies, three-dimensional, environment-mapping maps are generated. The three-dimensional point clouds of these maps can be assigned image features of captured images of the environment by machine learning. This makes it possible to generate a three-dimensional trajectory to the target object in the environment. The vehicle moves along this trajectory by providing the generated first control signals to the vehicle actuator to minimize the distance to the target location or object. When the minimum distance to the target is reached, the vehicle stops.

It is also possible to project destination input selection data to the passenger in real time on his or her head-up field of view in the wearable by arranging the wearable image sensor and/or at least one, preferably image-based, environment-sensing sensor assembly to align with the environment based on the direction of the passenger's direction of view and to transmit first sensor assembly signals to the control unit. Using the first sensor assembly signals, the control unit determines destination input selection data and transmits it to the wearable for projection into the head-up display. Preferably, this is done over an LTE or a 5G connection.

The passenger can thus perform a target selection directly based on the real-time images or a real-time video, and seventh sensor signals, in particular passenger destination input sensor signals, are transmitted from the wearable to the control unit. The control unit can determine the first control signals using the seventh sensor signals.

The second, third and fifth sensor signals are used by the control unit to provide feedback on whether the vehicle is on the right path to its destination from the passenger's point of view. The passenger's facial expression, heart rate and thoughts are monitored, with safety mode being adopted if a critical physical condition of the passenger is detected based on the sensor signals. The automated control of a selected target object can also be interrupted or terminated at any time by manual override by the passenger.

In one embodiment, an eighth sensor, in particular a position sensor, for example a GPS sensor or a sensor for locating inside buildings, is arranged and designed to output eighth sensor signals, with the control unit receiving the eighth sensor signals and determining the first control signals using them.

The position sensor allows the display of a map showing the current position of the vehicle or passenger using the head-up projection of the wearable or on their cell phone. The use of a map in conjunction with the displayed destination input selection data allows the selection of destinations or objects that can no longer be sensed by environmental sensing sensors. A target can be selected by guiding a virtual mouse pointer via eye control in the head-up projection of the wearable or by selection on the cell phone.

Based on the passenger's destination input, the seventh passenger destination sensor signals are provided to the control unit. Using the map and the eighth position sensor signals, a trajectory to the target location or object can be determined and corresponding first control signals can be provided.

Thus, the control unit has the task of calculating a trajectory to the destination, providing suitable first control signals, and, during the journey to the destination, making adjustments to the trajectory based on the real-time data from the environment-sensing sensors, for example due to the changing environment, and providing adjusted first control signals. After reaching the target location or target object, the vehicle stops.

The second, third and fifth sensor signals can be used by the control unit to provide feedback on whether the vehicle is on the right path to its destination from the passenger's point of view. The passenger's facial expression, heart rate and thoughts are monitored, with safety mode being adopted if a critical physical condition of the passenger is detected on the basis of the sensor signals.

Also, the automated control of a selected target object can be interrupted or terminated at any time by manual override by the passenger.

In one embodiment, the device comprises a remote communication device, for example an LTE or 5G communication device or a mobile telephony communication device, arranged on the vehicle and designed to perform signal exchange with the control unit and external mobile telephony provider devices. In this case, the wearable is also connected to the control unit via an LTE or 5G connection so that (video) communication can be performed or images or videos captured by the wearable image sensor can be provided to others in personal messages or via social networks.

Furthermore, in case of an initiated safety mode, for example due to a detected critical physical condition of the passenger, at least one emergency contact can be contacted automatically.

In one embodiment, the device also comprises vehicle dynamics sensors, in particular wheel speed sensors and/or inertial navigation units with integrated accelerometers and/or rate-of-rotation meters and/or compass, arranged on the vehicle and designed to output ninth sensor signals, wherein the control unit receives the ninth sensor signals and uses them to determine the first control signals. In particular, this sensor system allows the vehicle dynamics to be controlled by feeding back actual vehicle dynamics sensor variables to the control unit in order to enable more precise implementation of the desired control commands compared with a control system.

In another embodiment, the image-based front sensor for detecting the passenger's face is replaced by an image-based vehicle sensor, wherein the image-based vehicle sensor transmits image-based sensor signals to the control unit and, using the image-based sensor signals, the control unit determines the first control signals and evaluates whether the first reliability criteria are met.

Further advantageous embodiments result from the subclaims.

In the following, the invention is also described with regard to further features and advantages on the basis of exemplary embodiments, which are explained in more detail with reference to the figures, wherein.

Figure 1:
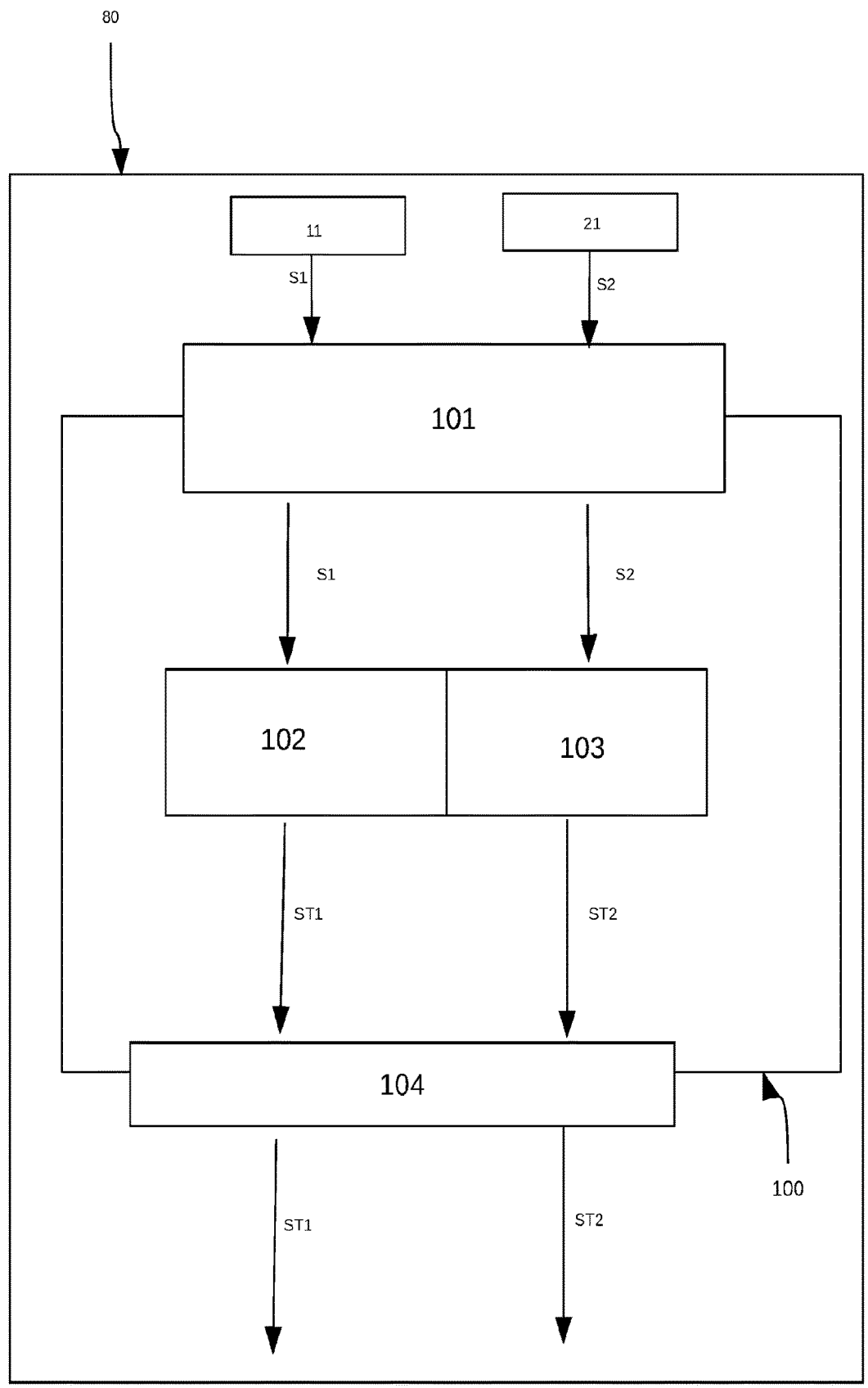
FIG. 1 shows a flowchart of the device according to an exemplary embodiment.

In the following description and in the drawings, the same reference signs are used for identical and similarly acting parts.

Figure 2:
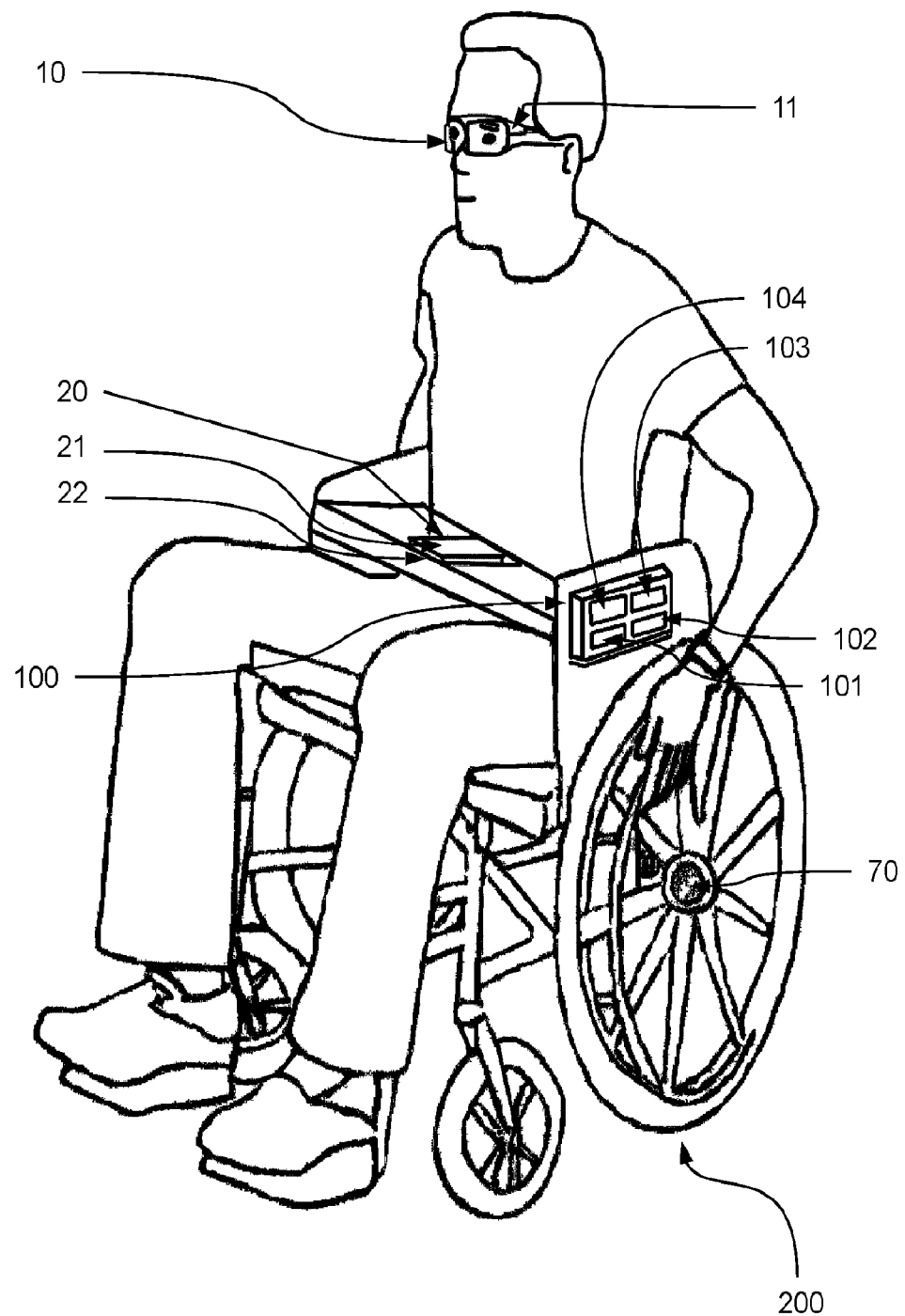
FIG. 2 shows a vehicle with wearable, inertial navigation unit, image-based sensor, control unit and vehicle actuators.

FIG. 1 shows a flowchart of a device 80 for navigating a wheelchair 200 (see FIG. 2).

In one exemplary embodiment, the device 80 comprises two sensors. The first sensor is an inertial navigation unit 11 attached to a wearable computer system, wearable 10, on the head of a wheelchair user of a wheelchair 200 (e.g., FIG. 2). For example, it is part of Google Glass worn by the wheelchair user. The inertial navigation unit 11 detects position and rotation of the head of the wheelchair user and outputs this data as first sensor signals S1. An image-based front sensor 21 of a cell phone 20 (FIG. 2) serves as a second sensor, wherein the cell phone 20 is fixed to a component of the wheelchair 200 such that the front sensor 21 detects the head of the wheelchair user. Image data of the front sensor 21 generated in this process is output by the cell phone 20 as second sensor signals S2.

A control unit 100 is communicatively connected, e.g. via Bluetooth, to Google Glass and receives the first sensor signals S1. The second sensor signals S2 can be transmitted to the control unit 100, in particular to a sensor signal receiving unit 101, via a USB connection. In a control signal determination unit 102 of the control unit 100, based on the first sensor signals S1, first control signals ST1 for controlling the wheelchair 200 are generated. Based on the second sensor signals S2, a reliability criteria checking unit 103 determines whether the first control signals ST1 satisfy first reliability criteria.

A safety mode is adopted when the reliability criteria checking unit 103 determines that the first control signals ST1 do not comply with the first reliability criteria.

The reliability criteria checking unit 103 determines basic data based on the second sensor signals S2. The basic data includes geometric dimensions, size ratios, and features of the face. These geometrically or mathematically expressed features of the basic data characterize the perceptible facial expressions of a person, thereby allowing classification of the emotional state or emotions felt by the wheelchair user during operation of the wheelchair 200.

Devices for classifying the emotions of a person on the basis of recognized geometric dimensions, proportions and features of the face are known. For example, IN 00554CH2014 A describes a method and a device with which facial expressions of persons that have changed compared to previously determined, neutral facial expressions can be recognized and assigned to one or more emotions. The teachings of IN 00554CH2014 A use so-called constrained local model (CLM) methods for recognizing faces in order to then determine dimensions, proportions and shapes of features such as eyes, nose, mouth or chin. Furthermore, a support vector machine (SVM) can be trained to infer actions such as closing an eye or opening a mouth from the previously recognized geometric facial features using a variety of previously labeled image data of faces. Finally, a statistical procedure (Discriminative Power Concept) is used to determine the probability of a particular emotion of a person by evaluating how likely an action is if a particular emotion is present minus the probability of that action if that emotion is not present.

Specifically, this may mean that when upwardly drawn corners of the mouth are detected relative to a known, neutral mouth position, a state of happiness of the wheelchair user is determined, since none of the known, further emotions are characterized by upwardly drawn corners of the mouth. The IN 00554CH2014 A identifies the emotions anger, fear, happiness state, surprise state, disgust, sadness as recognizable. In addition, probabilities of the individual emotions are output in each case.

The exemplary embodiment offers the possibility and thus the advantage of the individual classifiability of the image-based facial feature recognition to the concrete wheelchair user, provided that the support vector machine SVM is (also) trained with labeled image data of facial muscle movements of the wheelchair user. Moreover, the captured features of the face underlying the classification of the emotion can be evaluated in real time. For this purpose, these are superimposed on the image data sequence (video sequence) of the second sensor signals S2 of the image-based front sensor 21.

Alternatively, according to another exemplary embodiment as shown in FIG. 1, the basis of the classification of the wheelchair user's emotions is an implementation of a convolutional neural network (CNN) applied to the second sensor signals S2 in the reliability criteria checking unit 103. For this artificial intelligence approach, it is necessary to provide pre-labeled image data, i.e., image data with associated emotions of a person, for classification of the expressed emotion of the wheelchair user. In this case, the geometric features of the face, their dimensions and size ratios are not visible during the training due to the abstract representation of the trained weights of the neural network.

The hit rate and thus the quality of the emotion recognition is to be assessed on the basis of a test data set. The convolutional neural network is designed in such a way that a probability value is assigned to each of the number of emotions of the wheelchair user to be recognized. The use of the neural network has the advantage that similar to the human perception of emotions in faces, not one or a few features of the face are taken into account, but the emotion of the wheelchair user is determined in the interaction of all image data transmitted by the second sensor signals S2. Thus, the CNN training data can also implicitly consider person-specific features of the face, such as smile lines, for emotion recognition without explicitly characterizing them in the training data.

Regardless of the choice of emotion classification means, SVM or CNN, if the wheelchair user is highly likely to be in a state of happiness, a state of relaxation, or a similar state associated with positive emotion, the first reliability criteria should be met.

However, a detected positive sentiment does not only mean that the first reliability criteria are met. In addition, a time series recording of the position and rotation data of the head of the wheelchair user is also performed in the control signal determination unit 102, which is made available to a machine learning algorithm. This algorithm can detect and process the individual movement sequences of the head of the wheelchair user mapped by the data, whereby the wheelchair control is adapted to the personal requirements.

It is possible to determine for each wheelchair user the maximum occurring inclinations of the head in the directions front/rear or left/right during operation of the wheelchair 200 as well as the corresponding rotation speeds. Thus, for a wheelchair user with still available but severely restricted freedom of movement of the neck, even a slight inclination of the head in one direction can mean a maximum movement of the wheelchair in the desired direction. The additional recording of the rotation speeds via the position angle of the head also makes it possible to avoid interpreting head inclinations that inevitably result from illness-related trembling or nervous wheelchair users as control commands. This also allows wheelchair users with unintentional or uncontrolled jerky head movements to have a smoother, more individual driving behavior of the wheelchair.

Regression algorithms lend themselves as machine learning algorithms for this task. As a result, a characteristic of the control of the wheelchair 200 desired by the wheelchair user need not be based on only a single recorded position-time or rotational speed-position function. Rather, multiple, temporally spaced recorded functions can be used to map an averaged, individual characteristic of the control of the wheelchair 200.

If the first reliability criteria are met, control is effected by tilting the head upward to cause the wheelchair 200 to move forward or backward, depending on the presetting. A leftward or rightward tilt of the head will cause the wheelchair to move leftward or rightward, respectively. To stop the wheelchair, the head is moved to a previously defined normal or neutral position.

The first reliability criteria are intended to signify a failure to meet the first reliability criteria when there is a high probability of an inability to control wheelchair 200 such as apprehension, a state of surprise, a state of anxiety, a state of dissatisfaction, or a similar state of the wheelchair user associated with negative emotion. For example, downturned corners of the mouth signal a dissatisfaction state. States of surprise and anxiety can be identified by the detection of wide open eyes or mouth. An inability to control the wheelchair 200 is inferred from closing the eyes for a period longer than a blink period. The training data provided to the convolutional neural network (CNN) takes into account this mapping of facial expressions to emotions or states. The same applies to the exemplary embodiment for the classification of emotions by the support vector machine (SVM).

The safety mode is a restricted operation range of the device 80, wherein in the safety mode, second control signals ST2 are output from the reliability criteria checking unit 103. In this case, if there is an inability to control the wheelchair 200, e.g. if the wheelchair user has closed his eyes, the second control signals ST2 will cause the wheelchair to slow down and stop.

When the probability of a state of surprise, a state of fear, or a state of apprehension of the wheelchair user is increased, the reliability criteria checking unit 103 uses the first sensor signals S1 of the inertial navigation unit 11 to determine the second control signals ST2. If the determined position or rotation of the wheelchair user's head is within an inadmissible range of values, the second control signals ST2 cause the wheelchair 200 to stop. On the other hand, if the position and rotation of the wheelchair user's head is within an admissible range of values, only the maximum speed of the wheelchair 200 is reduced because the reliability criteria checking unit 103 assumes that it has been unreasonably high for the wheelchair user so far.

The second control signals ST2 are not equal to the first control signals ST1, but both can be output from the device 80 by the control signal output unit 104. Only the control signals that are valid at one time are output.

This arrangement ensures that recognizably negative emotions of the wheelchair user or an inability to control the wheelchair 200 are detected and the safety mode is adopted. In addition, third parties and the wheelchair user cannot be further physically harmed as a result.

When the first reliability criteria are met, the first control signals ST1 are determined by the control signal determination unit 102 of the wheelchair 200 using the first sensor signals S1. Depending on the default setting, tilting the head of the wheelchair user upward means moving forward or moving backward, while tilting the head to the side means orienting the wheelchair 200 to that side.

In another exemplary embodiment of the wheelchair 200 in FIG. 2, the control unit 100 is further configured to determine the first control signals ST1 in addition to the first sensor signals S1 from the inertial navigation unit 11 attached to the wearable 10 using also the second sensor signals from the image-based front sensor 21. In this regard, the safety mode is adopted when the first reliability criteria or the second reliability criteria are not met. The safety mode is also adopted when both reliability criteria are not met. In this exemplary embodiment, the second reliability criteria are based on accuracy and reliability analysis of the first sensor signals S1 and the second sensor signals S2 by the reliability criteria checking unit 103.

The accuracy and reliability analysis is performed using the first sensor signals S1 and the second sensor signals S2, which include feature values of the position and rotation of the head of the wheelchair user. Based on their matching, the reliability of the inertial navigation unit 11 and the image-based front sensor 21 is determined. If the position and rotation features used for controlling the wheelchair 200 match within predefined tolerances, the feature values of the inertial navigation unit 11 are used for determining the first control signals ST1. The control of the wheelchair 200 is performed as shown in the preceding exemplary embodiment.

If one or more of the tolerances are exceeded, the second sensor signals S2 of the image-based front sensor 21 are used again and, in the event of poor accuracy and reliability, for example due to poor image quality, a signal about the poor reliability is transmitted to the wheelchair user on his cell phone 20 and displayed there. The poor image quality can be detected by the fact that the algorithm used to detect the wheelchair user's emotion assigns only low probabilities to each of the individual emotions, e.g., happiness state, dissatisfaction. The generation of first control signals ST1 based on the first sensor signals S1 is further enabled.

If the reliability of the front sensor 21 is sufficient, the safety mode is initiated because the reliability criteria checking unit 103 assumes a failure of the inertial navigation unit 11. The wheelchair 200 is stopped.

By continuously matching the feature values of the inertial navigation unit 11 and the image-based front sensor 21, safe operation of the wheelchair 200 is enabled and immediate action is taken to minimize the consequences of damage in the event of sensor failure.

Figure 3:
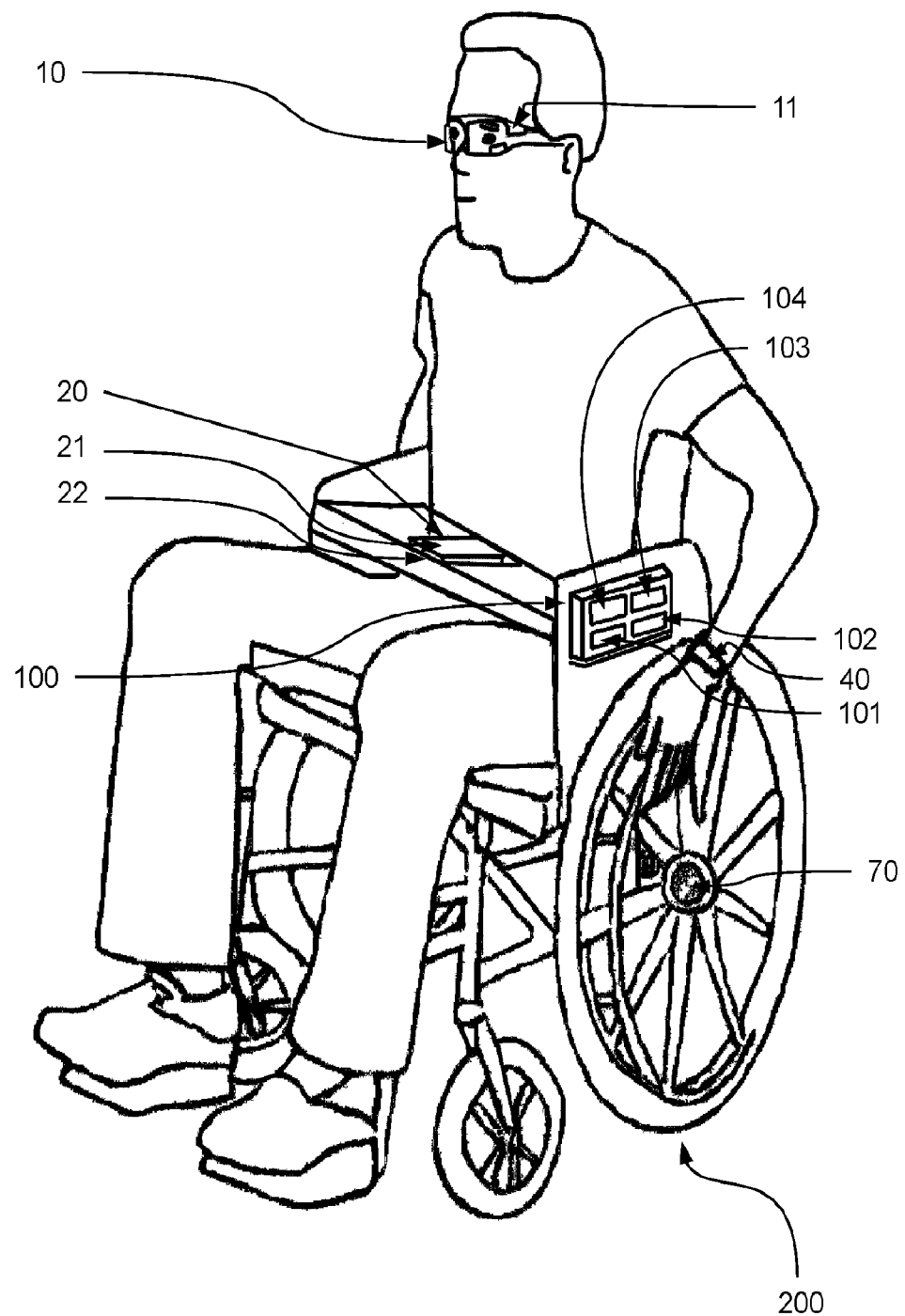
FIG. 3 shows the vehicle according to FIG. 2 with vitality data sensor.

FIG. 3 shows another exemplary embodiment in which, in addition, a vitality data sensor 40 is arranged as a third sensor on the wrist of the wheelchair user in order to detect the heart rate of the wheelchair user and output third sensor signals. The control unit 100 receives the third sensor signals transmitted, for example, via a Bluetooth connection by means of the sensor signal receiving unit 101, and the reliability criteria checking unit 103 further checks whether there is a high probability of a state of concern or anxiety of the wheelchair user when the third sensor signals do not comply with an allowable heart rate value range. If this is also the case, the second reliability criteria are evaluated as not met. As a result, the safety mode is adopted. The second control signals ST2 cause the wheelchair 200 to stop.

Figure 4:
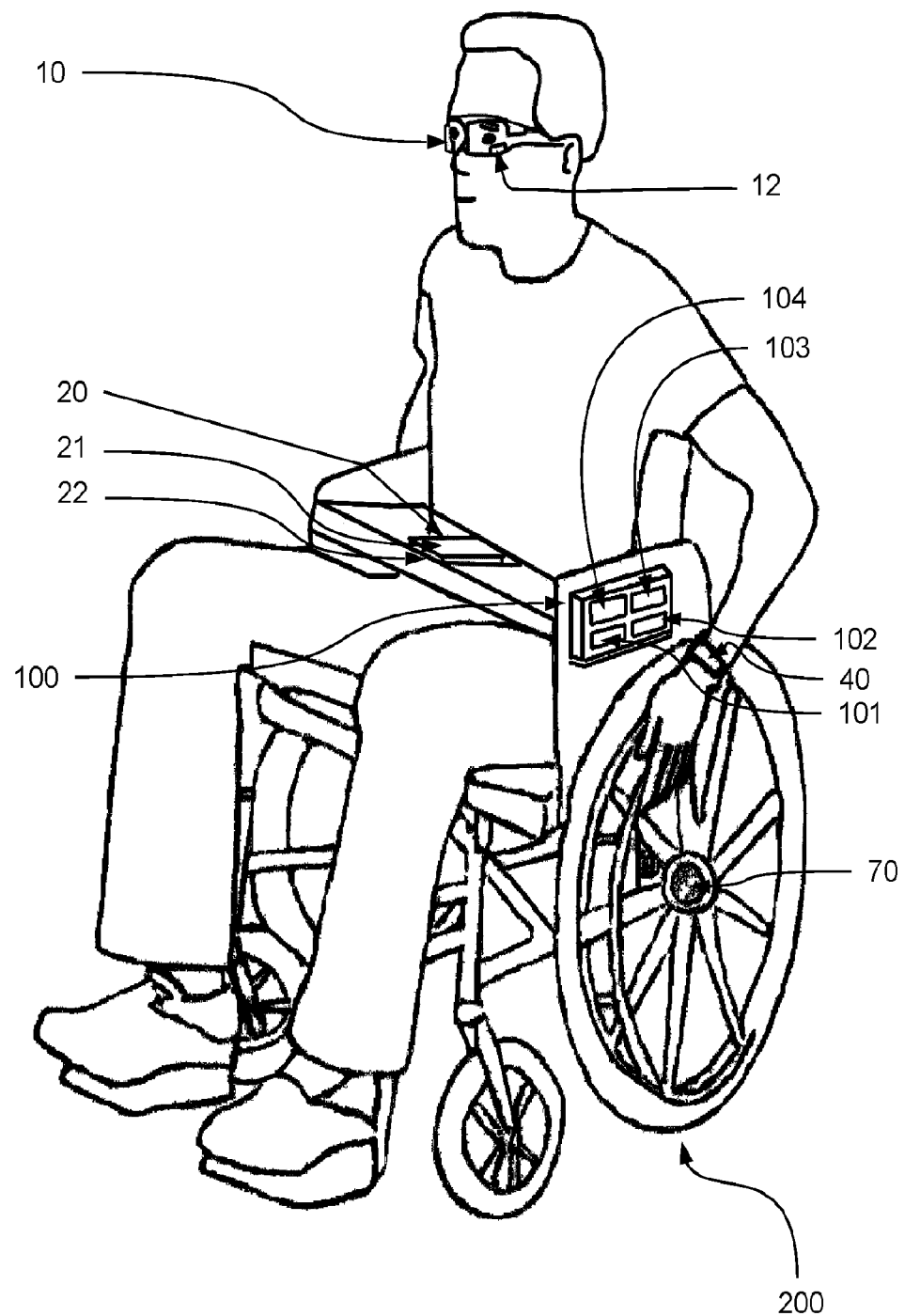
FIG. 4 shows the vehicle shown in FIG. 3 without inertial navigation unit, with eye feature detection unit.

FIG. 4 shows another exemplary embodiment similar to the preceding example. However, instead of the inertial navigation unit 11, this has an eye feature detection unit 12 as the first sensor. This is attached to the wearable 10 and connected to it, for example via cabling, and is designed to detect the position and translation of the iris of an eye of the wheelchair user and to output first sensor signals S1, wherein the sensor signal receiving unit 101 receives the first sensor signals S1 after they have been forwarded by the wearable 10 and uses them to determine the first control signals ST1 for controlling the wheelchair 200.

Based on the accuracy and reliability analysis of the first sensor signals S1 of the eye feature detection unit 12 and the second sensor signals S2 of the image-based front sensor 21, the reliability criteria checking unit 103 checks whether the second reliability criteria are met. The reliability criteria checking unit 103 determines whether there are deviations of the feature values position and translation of the iris of an eye.

Deviations of these characteristic values must be within predefined, permissible tolerances of the second reliability criteria.

If one or more tolerances are exceeded, the sensor signals of the image-based front sensor 21 are used, as in the preceding exemplary embodiment, and if the accuracy and reliability are poor, for example due to poor image quality, a signal about the poor reliability is projected to the wheelchair user through the wearable 10 into his field of view. In addition, the information is transmitted by the control signal output unit 104, for example via a Bluetooth connection, to his cell phone 20. Generating first control signals ST1 based on the first sensor signals S1 is further enabled.

If the tolerance is not met, i.e., if the allowed position deviation of the iris position detected by both sensors is not met despite sufficient reliability of the image-based front sensor 21, the safety mode is initiated because the reliability criteria checking unit 103 assumes errors in the eye feature detection unit 12. The safety mode causes the wheelchair 200 to stop.

When the iris positions and translations of an eye determined by the second and fourth sensors match within tolerances, a final position value is determined by the control signal determination unit 102 by calibrating the eye movement range. In this process, the maximum movement of the eyes to the left, right, up, and down is determined, thereby enabling eye position proportional control of the wheelchair 200. If a reliable iris position cannot be determined in this process, the second reliability criteria are not met, the safety mode is adopted, and the wheelchair 200 is stopped.

If the first and second reliability criteria are not violated, the eye feature-based control of the wheelchair 200 is started by assuming an initial state, for example, by fixing a point in the center of the pair of eyes. Also, a sequence of gestures, for example, eye blinks or a predefined eye movement pattern, may signify the starting of the eye feature-based control by the control signal detection unit 102. In this regard, an eye movement pattern is a sequence of gaze directions defined and executed by the wheelchair user.

The wheelchair 200 is controlled by assigning a viewing direction to the desired direction of movement. The control of the direction of movement of the wheelchair 200 is done by a gaze to the left signifying a rotation of the wheelchair 200 to the left and a gaze to the right signifying a rotation of the wheelchair to the right. The wheelchair 200 is stopped by detecting a predefined gesture, such as closing the eyes, or blinking the eyes several times, by the first sensor, the eye feature detection unit 12, or by the second sensor, the image-based front sensor 21.

Continuous analysis of the sensors enables safe operation of the wheelchair 200 and immediate action is taken to minimize the consequences of damage in the event of sensor failure. Safety is further enhanced by the vitality data sensor 40. This is because unless the third sensor signals meet a vitality parameter value range, the second reliability criteria are not met. The safety mode is adopted.

Figure 5:
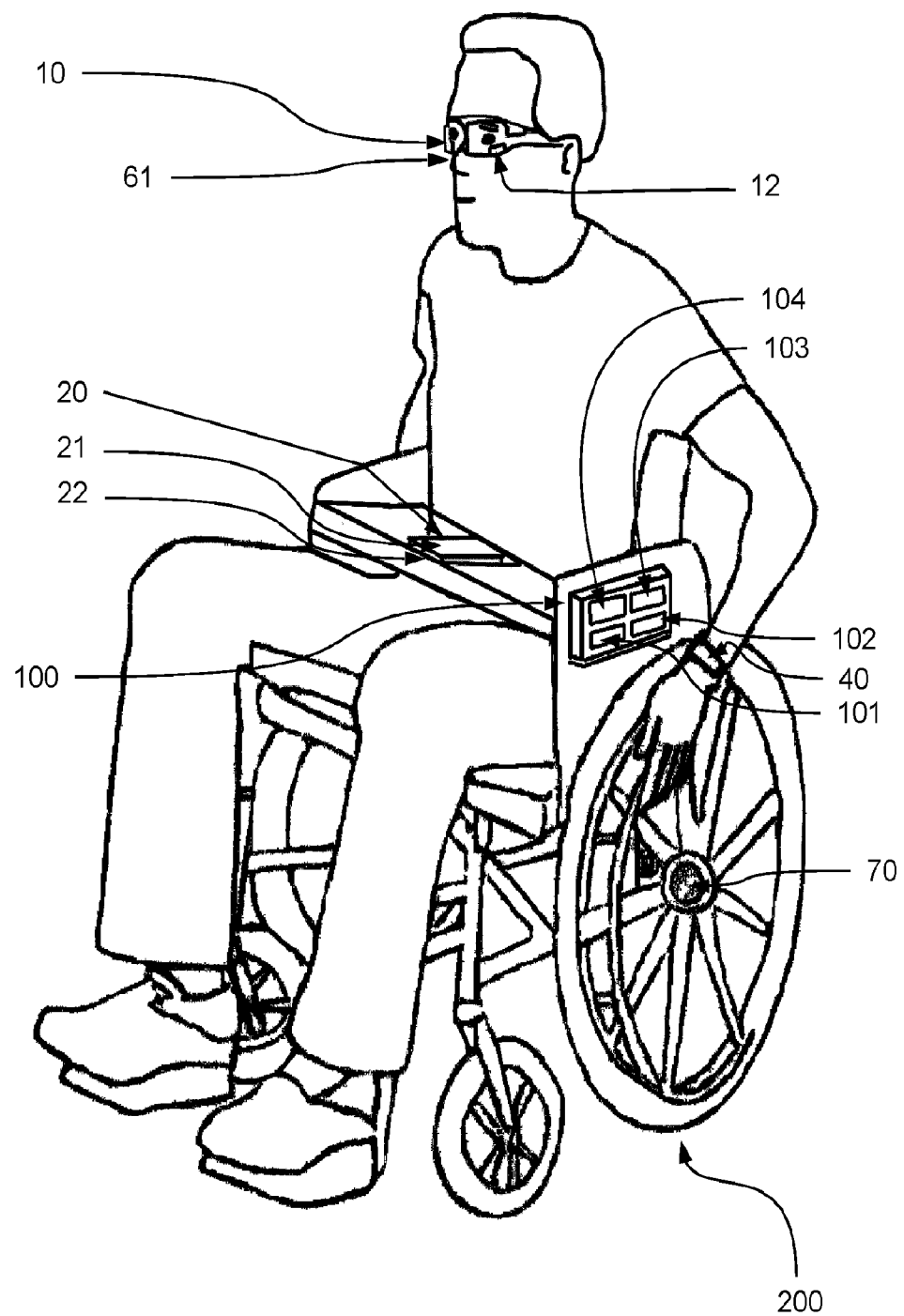
FIG. 5 shows the vehicle shown in FIG. 4, with wearable voice input sensor.

FIG. 5 shows a further, modified exemplary embodiment in which the first sensor is a wearable voice input sensor 61 that is attached to the wearable 10 and connected thereto, for example, by cabling. The wearable voice input sensor 61 is configured to output first sensor signals S1, wherein the sensor signal receiving unit 101 receives the first sensor signals S1 after being forwarded by the wearable 10 and determines the first control signals ST1 for controlling the vehicle 200 in the control signal determination unit 102 by using them.

The control signal determination unit 102 is configured to use an implementation of a recurrent neural network (RNN) when processing the first sensor signals S1 to determine the first control signals ST1. These algorithms for analyzing completed, sequential speech sensor signals allow for training that is more efficient in terms of time, for example, compared to fully-connected neural networks (FCN), as well as improved recognition of the speech inputs of the wheelchair user with comparable computational effort.

Especially for wheelchair users with limited speech capabilities, the self-learning neural networks allow the speech recognition to be adapted to the voice of the wheelchair user. On the one hand, the control commands issued by speech input can result in the first control signals ST1 for driving (off) or stopping the wheelchair 200. On the other hand, voice inputs are used to operate a menu navigation, which is displayed to the wheelchair user by the wearable 10 by projection of an ordinary head-up display. This allows commands to be issued, for example, to open doors, order elevators, press buttons, operate switches.

The control unit 100 is further configured to determine the first control signals ST1 in addition to the first sensor signals S1 of the wearable voice input sensor 61 using also second sensor signals S2 of the image-based front sensor 21. In this case, the second sensor is directed at the head of the wheelchair user and is designed to detect the position and translation of both eyes or their irises and to output the second sensor signals S2.

As a third sensor, the vitality data sensor 40 is arranged on the wrist of the wheelchair user for determining the heart rate, wherein this sensor as well as the control unit 100 are designed to provide the functionalities according to the preceding exemplary embodiments.

The eye feature detection unit 12, attached to the wearable 10, is used as the fourth sensor. Like the second sensor, the image-based front sensor 21, the eye feature detection unit 12 is configured to detect the position or translation of an eye or iris of the wheelchair user and output fourth sensor signals, wherein the sensor signal receiving unit 101 receives the fourth control signals and, using them, the control signal determination unit 102 determines the first control signals ST1 for controlling the vehicle 200. The eye feature detection unit 12 is an infrared light-based eye feature detection unit.

Consequently, in this exemplary embodiment, the first sensor signals S1, the second sensor signals S2, and the fourth sensor signals are used to determine the first control signals ST1. This results in a redundant system, and the use of the infrared-light-based eye feature detection unit 12 results in diversitary redundancy in eye feature detection by the second and fourth sensors.

The safety mode is adopted in this exemplary embodiment when the reliability criteria checking unit 103 determines that the first reliability criteria or the second reliability criteria are not satisfied. Satisfaction of the first reliability criteria is determined in the reliability criteria checking unit 103 using at least the basic data of the second sensor, the image-based front sensor 21, as shown in the preceding exemplary embodiments.

As in previous exemplary embodiments, the evaluation of the second reliability criteria comprises a reliability and accuracy analysis. Based on the second sensor signals S2 of the image-based front sensor 21 and the fourth sensor signals of the eye feature detection unit 12, the reliability criteria checking unit 103 checks whether the deviation of the position or translation of an eye of the wheelchair user is within the respective permissible tolerance.

If one or more of the tolerances are exceeded, as described in the preceding exemplary embodiments, the sensor signals of the image-based front sensor 21 are used, and if the accuracy and reliability are poor, for example due to poor image quality, a signal about the poor reliability is transmitted to the wheelchair user via the wearable 10 or to his cell phone 20. Generating first control signals ST1 using the fourth sensor signals by the control signal determination unit 102 is further enabled, and the first control signals ST1 are output by the control signal output unit 104.

Unless low reliability of the image-based front sensor 21 is detected when one or more of the tolerances is exceeded, the safety mode is adopted and the wheelchair 200 is stopped. The reason for this is that if the reliability of the image-based front sensor 21 is sufficient, the reliability criteria checking unit 103 assumes that there is an error in the eye feature detection unit 12.

The wheelchair is controlled as in the preceding exemplary embodiment. In addition, however, the first sensor, the wearable voice input sensor 61, can be used to detect a start command.

Also, the wheelchair 200 is brought to a stop by voice input using the first sensor, the wearable voice input sensor 61.

Continuous analysis of the sensors enables safe operation of the wheelchair 200 and immediate action is taken to minimize the consequences of damage in the event of sensor failure. Safety is further enhanced by the use of the third sensor, the vitality data sensor 40, because unless the third sensor signals satisfy a vitality parameter value range, the reliability criteria checking unit 103 determines that the second reliability criteria are not satisfied. The safety mode is adopted according to the conditions of the preceding exemplary embodiments.

Figure 6:
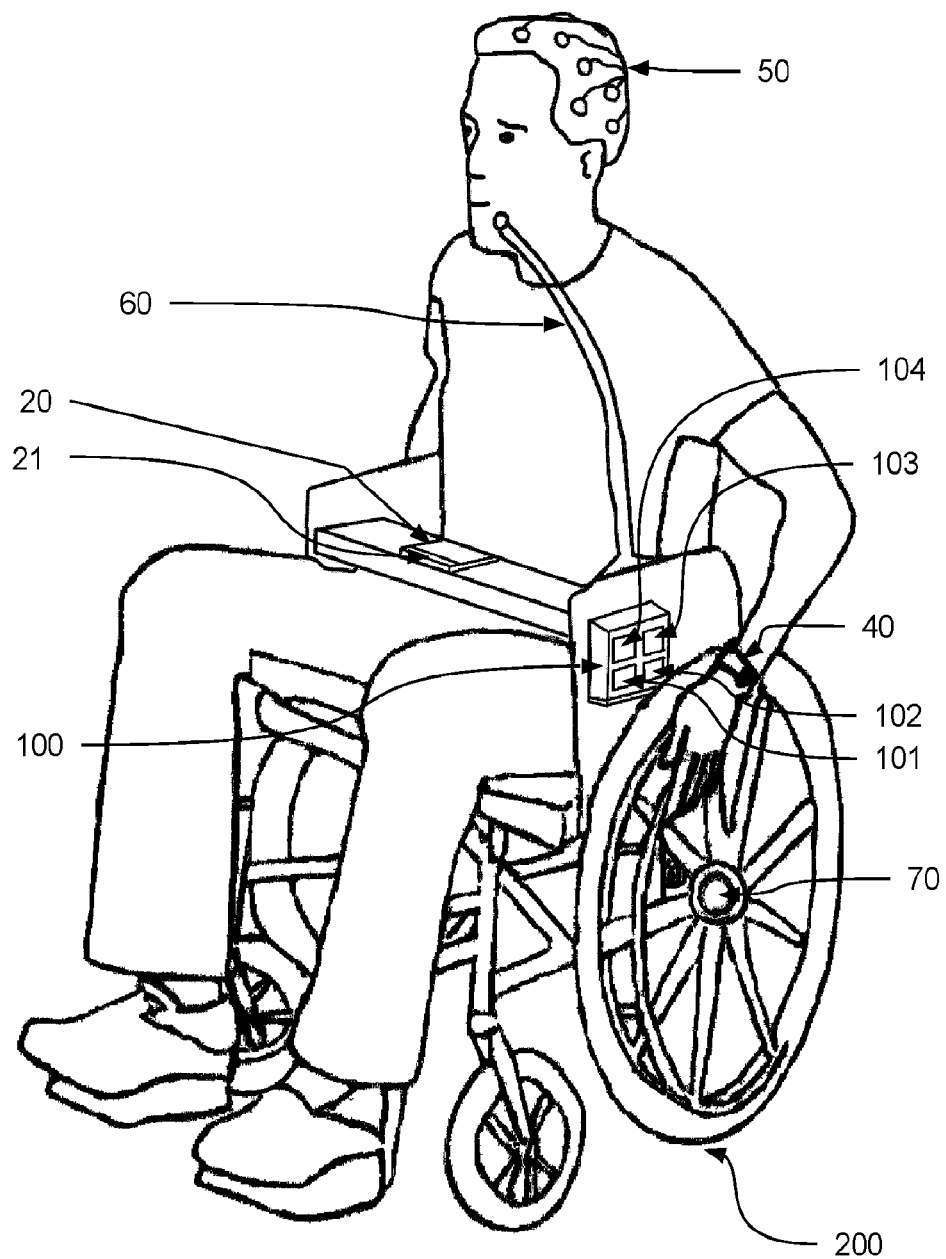
FIG. 6 shows the vehicle according to FIG. 3, without wearable, without inertial navigation unit, with brain control unit interface or input device, without wearable voice input sensor, with vehicle voice input sensor.

FIG. 6 shows a further exemplary embodiment of the wheelchair 200 according to the invention, wherein instead of the fourth sensor, the eye feature detection unit 12, a fifth sensor, a brain control unit interface or input device 50 is arranged on the head of the wheelchair user. This is designed to output fifth sensor signals, wherein the sensor signal receiving unit 101 receives the fifth sensor signals, for example via a Bluetooth connection, and determines the first control signals ST1 for controlling the wheelchair 200 in the control signal determination unit 102 using them.

A brain control unit interface is known from US 2017/0042439A1. Here, an electrode strip is arranged around a person's head in such a way that brain waves can be measured and subsequently processed. In the process, a mental state or emotion of the person can be determined.

The brain control unit interface or input device 50 is used as the primary control data source for generating the first control signals ST1. Furthermore, the image-based front sensor 21 is used to determine the first reliability criteria, and if the first reliability criteria are not met, the safety mode is adopted. In the case of an additional elevated heart rate detected by the vitality data sensor 40, the reliability criteria checking unit 103 assumes a critical physical condition of the wheelchair user and, furthermore, the second reliability criteria are not met. The wheelchair 200 is stopped.

In the control signal determination unit 102, the fifth sensor signals are detected so that a thought of the wheelchair user detected by the fifth sensor is assigned to a desired first control signal ST1.

For this purpose, the brain-control unit interface or input device 50 knows predefined control commands that are output as fifth sensor signals when the wheelchair user thinks of them.

However, the fifth sensor signals include not only predefined control commands.

As part of the fifth sensor signals, the abstract thought patterns of the wheelchair user detected by the fifth sensor are provided to a machine learning algorithm in the control signal determination unit 102. The learning algorithm learns from the data so that when a previously known thought pattern that can be associated with a control command of the wheelchair user is detected, the first control signals ST1 are determined based on the detected control command.

The machine learning algorithm is trained by recording, in accordance with the preceding exemplary embodiments, the emotion of the wheelchair user in response to a determined first control signal ST1 and also provided to the control signal determination unit 102. The heart rate of the wheelchair user is also provided. This allows the machine learning algorithm to learn which control commands determined based on the thought patterns are judged appropriate by the wheelchair user. This allows for customization of the thought-based control of the wheelchair 200 for the particular wheelchair user.

However, determining the emotions of the wheelchair user is not limited in application to training the machine learning algorithm.

Further, the fifth sensor signals are also used to determine whether the wheelchair user has panicked, for example, because the wheelchair user is in a dangerous physical condition. By combining with the first sensor, the vehicle voice input sensor 60, the second sensor, the image-based front sensor 21, and the third sensor of this exemplary embodiment, the vitality data sensor 40, dangerous situations can be classified more easily and driving the wheelchair 200 becomes safer.

Figure 7:
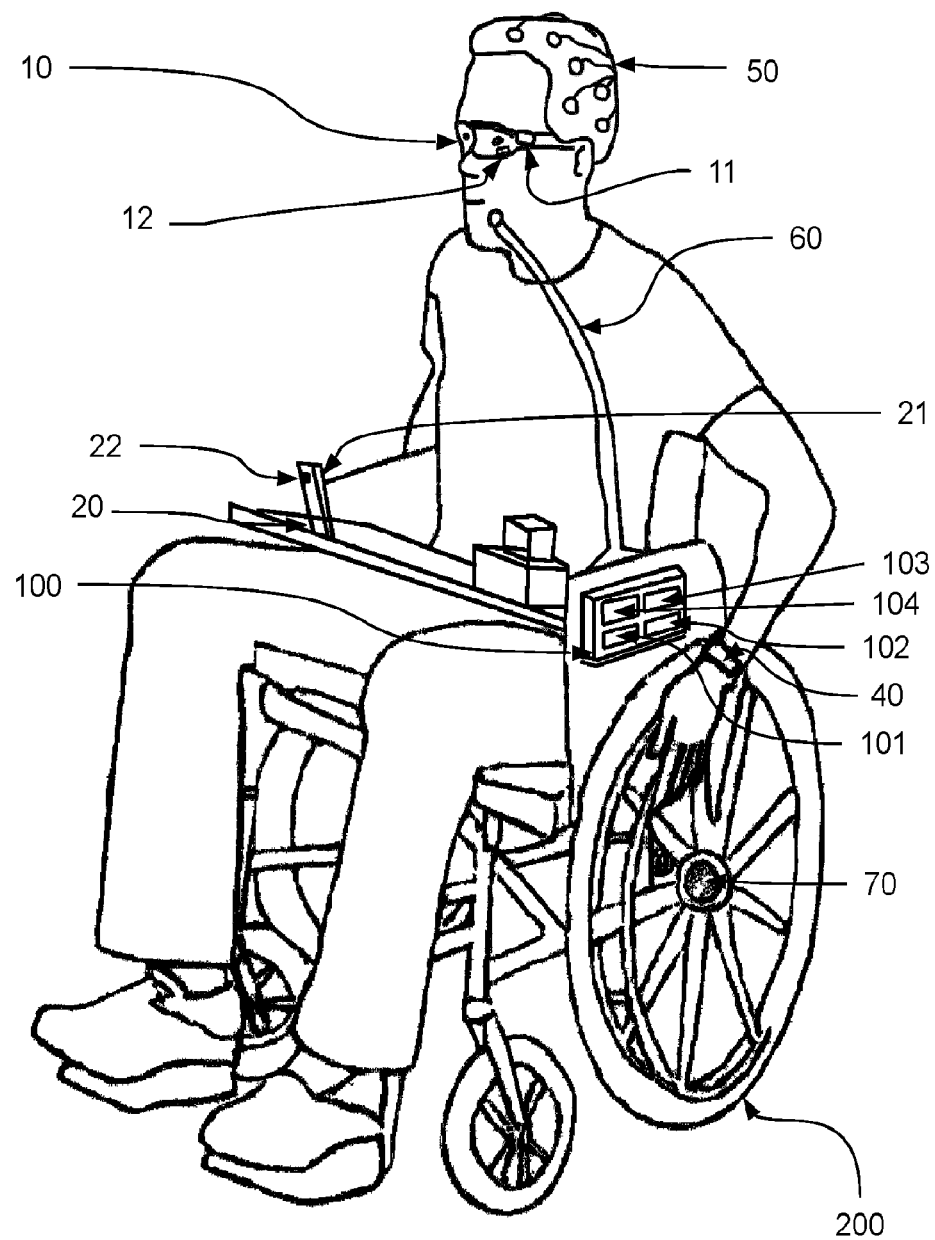
FIG. 7 shows the vehicle according to FIG. 6, with wearable, with inertial navigation unit, with eye feature detection unit, with speech input sensor.

FIG. 7 shows another exemplary embodiment of the wheelchair 200, combining all the sensors used so far to provide an even safer and more reliable solution. The first sensor used is the inertial navigation unit 11, attached to the wearable 10, to detect the position and rotation of the head of the wheelchair user and transmit first sensor signals S1 to the sensor signal receiving unit 101 and, using them, determine the first control signals ST1 in the control signal determination unit 102 for controlling the wheelchair 200. The second sensor, the image-based front sensor 21, detects the head of the wheelchair user or its features and transmits second sensor signals S2 to the control unit receiving unit 101, and using them, the reliability criteria checking unit 103 checks whether the first reliability criteria are satisfied, as known from previous exemplary embodiments. In addition, the first control signals ST1 for controlling the wheelchair 200 are determined using the second sensor signals S2.

The third sensor, vitality data sensor 40, is arranged and configured as in preceding exemplary embodiments. The fourth sensor, an eye feature detection unit 12, is attached to the wearable 10, and is configured to detect position and translation of an eye or an iris of the wheelchair user as known from previous embodiments. The fourth sensor signals are provided to the control unit 100, so that the first control signals ST1 can be determined using them.

Based on the accuracy and reliability analysis of the first sensor signals S1 of the inertial navigation unit 11 and the second sensor signals S2 of the second sensor of the image-based front sensor 21, the reliability criteria checking unit 103, as known from previous exemplary embodiments, checks whether the deviations of the position or the rotation of the head of the wheelchair user are within the respective permissible tolerances.

In the accuracy and reliability analysis of the second sensor signals S2 of the second sensor, the image-based front sensor 21 and the fourth sensor signals of the fourth sensor, the eye feature detection unit 12, the reliability criteria checking unit 103, as known from previous exemplary embodiments, checks whether the deviation of the features position or translation of one eye of the wheelchair user is within the respective tolerances.

The fifth sensor, the brain control unit interface or input device 50, is arranged and configured as known from the preceding exemplary embodiments. The control signal determination unit 102 determines, using the transmitted fifth sensor signals, control commands from the wheelchair user to start and stop the wheelchair 200.

The vehicle voice input sensor 60 is used as the sixth sensor, which is configured to output sixth sensor signals, wherein the control unit 100 receives the sixth sensor signals and determines the first control signals ST1 for controlling the wheelchair 200 using them. Through the vehicle voice input sensor 60, commands for starting or stopping the wheelchair 200 can be transmitted to the sensor signal receiving unit 101 by the sixth sensor signals.

Unless one or more of the tolerances are met, the second reliability criteria are not met. If the first or second reliability criteria are not met, the device 80 adopts the safety mode. If they are met, first control signals ST1 for moving the wheelchair 200 may be transmitted from the control signal output unit 104 to the vehicle actuators 70.

Using the fourth sensor signals, the desired direction of travel is determined by the control signal determination unit 102, and using the first sensor signals, the desired speed in the direction of travel is determined. From this, the first control signals ST1 are determined and output to the vehicle actuators 70 by the control signal output unit 104.

A forward look of the wheelchair user leads to a forward movement, a look to one side leads to a movement of the wheelchair 200 in the respective direction. Depending on the presetting, a downward pitching movement leads to an increase/decrease in the wheelchair speed, while an upward pitching movement has the opposite effect on the wheelchair speed in each case.

This exemplary embodiment also has the advantage over the previous ones of increasing the safety of the wheelchair user, since the user must look in the direction of travel.

Figure 8:
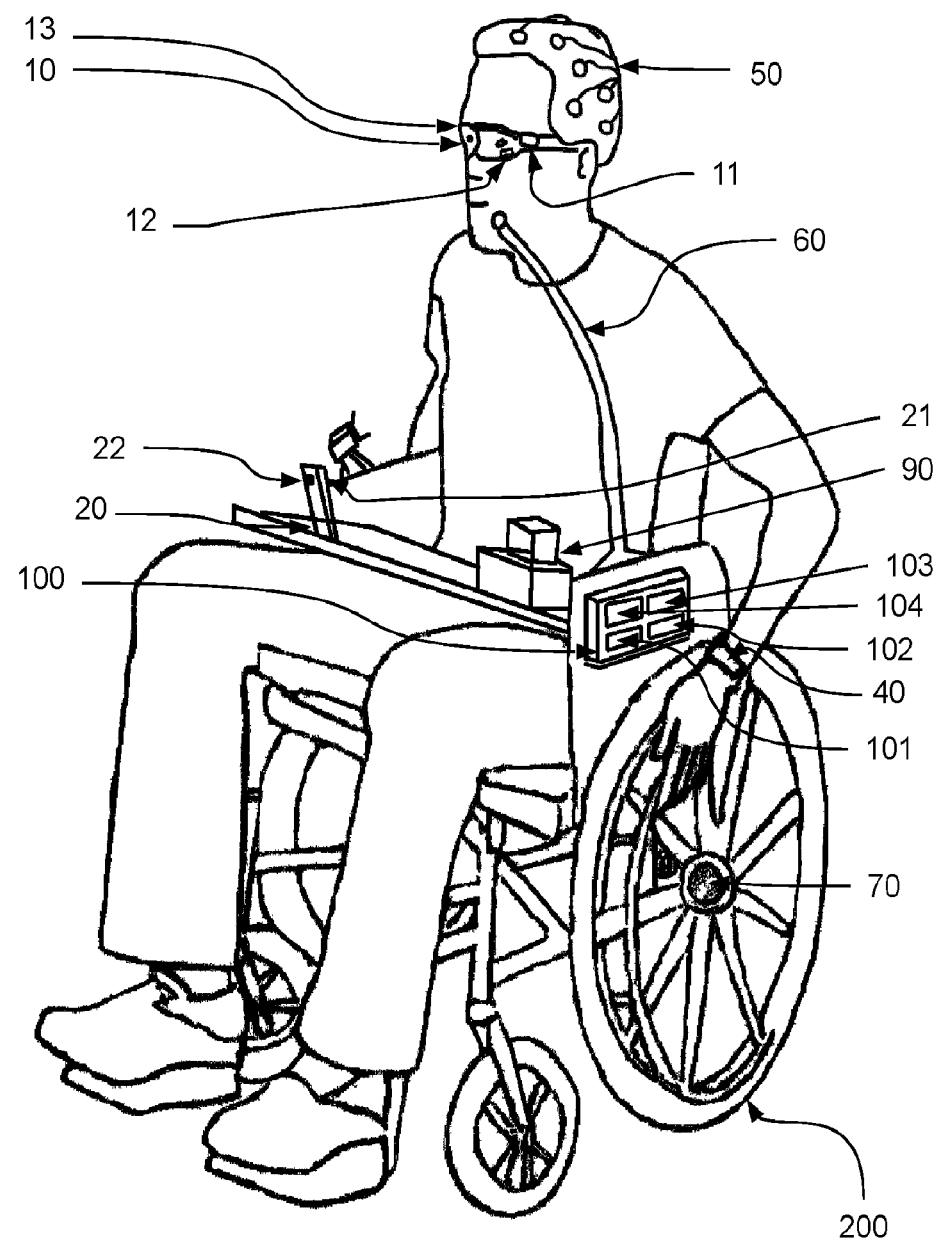
FIG. 8 shows the vehicle according to FIG. 7, with wearable image sensor, with environment-sensing sensor assembly.

FIG. 8 illustrates another exemplary embodiment that further comprises a first environment-sensing sensor assembly 90, a LIDAR sensor assembly. This is attached to the wheelchair 200 for sensing the environment and is designed to output first sensor assembly signals, wherein the control signal sensing unit 101 receives first sensor assembly signals via a high-speed data line, such as an Ethernet connection, and determines the first control signals ST1 using the same.

Furthermore, the perception of the environment is performed by an image-based rear sensor 22 of the cell phone 20 and a wearable image sensor 13, so that using them the first sensor signals ST1 are determined by the control signal determination unit 102. The wearable image sensor 13 is connected to the wearable 10 via data lines, for example, so that the wearable 10 transmits its sensor signals to the sensor signal receiving unit 102.

In this case, the detected environment information is evaluated by the control signal determination unit 102 and the reliability criteria checking unit 103, and the safety mode is adopted when a critical approach to obstacles, slopes, inclines or the like is detected. This causes the wheelchair 200 to stop.

In another exemplary embodiment, the wearable 10 and the cell phone 20 are configured to output seventh sensor signals, in particular passenger destination input sensor signals, wherein the control unit 100 has previously transmitted available destination input selection data to the wearable 10 and the cell phone 20 for passenger destination input.

The destination input selection data is created by evaluating the sensor signals of the first environment-sensing sensor assembly 90 by the control unit 100. The destinations can basically be any elements whose contours can be detected by a LIDAR sensor assembly 90 in combination with the further environment-sensing sensors 13, 22 and which are located in the environment of the wheelchair user.

Destination input selection data is projected into the wheelchair user's field of view, modeled on a head-up display from the wearable 10. In addition, the information is displayed on the screen of the cell phone 20. The sensor signal receiving unit 101 receives the seventh sensor signals and determines the first control signals ST1 using them.

In this context, the control signal determination unit 102 has the task of calculating a trajectory to the destination, providing suitable first control signals ST1, and, during travel to the destination, making adjustments to the trajectory, for example as a result of the changing environment, based on the real-time data from the environment-sensing sensors 13, 22 and the LIDAR sensor assembly 90, and providing adjusted first control signals ST1.

When the LIDAR sensor assembly 90 is used, three-dimensional, environment-mapping maps are generated. Image features of captured images of the environment are assigned to the three-dimensional point clouds of these maps by machine learning. This makes it possible to generate a three-dimensional trajectory to the target object in the environment. The wheelchair 200 moves along this trajectory by providing the generated, first control signals ST1 to the vehicle actuators 70 to minimize the distance to the destination or target object. When the minimum distance to the target is reached, the wheelchair 200 stops.

Real-time destination input selection data is projected to the wheelchair user in his or her head-up display in the wearable 10 by the wearable image sensor 13 transmitting its sensor signals to the control unit 100, and the environment-sensing LIDAR sensor assembly 90 is arranged to align with the environment based on the direction of the wheelchair user's direction of view and to transmit first sensor assembly signals to the control unit 100. The control unit determines destination input selection data using aforementioned signals and provides the same to the wearable 10 for projection into the head-up display.

As a result, the wheelchair user can perform a target object selection directly based on the real-time images or a real-time video, and seventh sensor signals, in particular passenger destination input sensor signals, are transmitted from the wearable 10 to the sensor signal receiving unit 101. The control signal determination unit 102 determines the first control signals ST1 using the seventh sensor signals.

The second, third, and fifth sensor signals are used by the control signal determination unit 102 to provide feedback on whether the wheelchair 200 is on the correct path to the destination from the wheelchair user's perspective. In this regard, the facial expression of the wheelchair user, vitality parameters, and the thoughts of the wheelchair user are monitored, with the safety mode being adopted if a critical physical condition of the wheelchair user is detected based on the sensor signals. Also, at any time, the automated actuation of a selected target object can be interrupted or terminated by manual override by the wheelchair user, for example based on the sensor signals from the inertial navigation unit 11, the eye feature detection unit 12, or the image-based front sensor 21.

Figure 9:
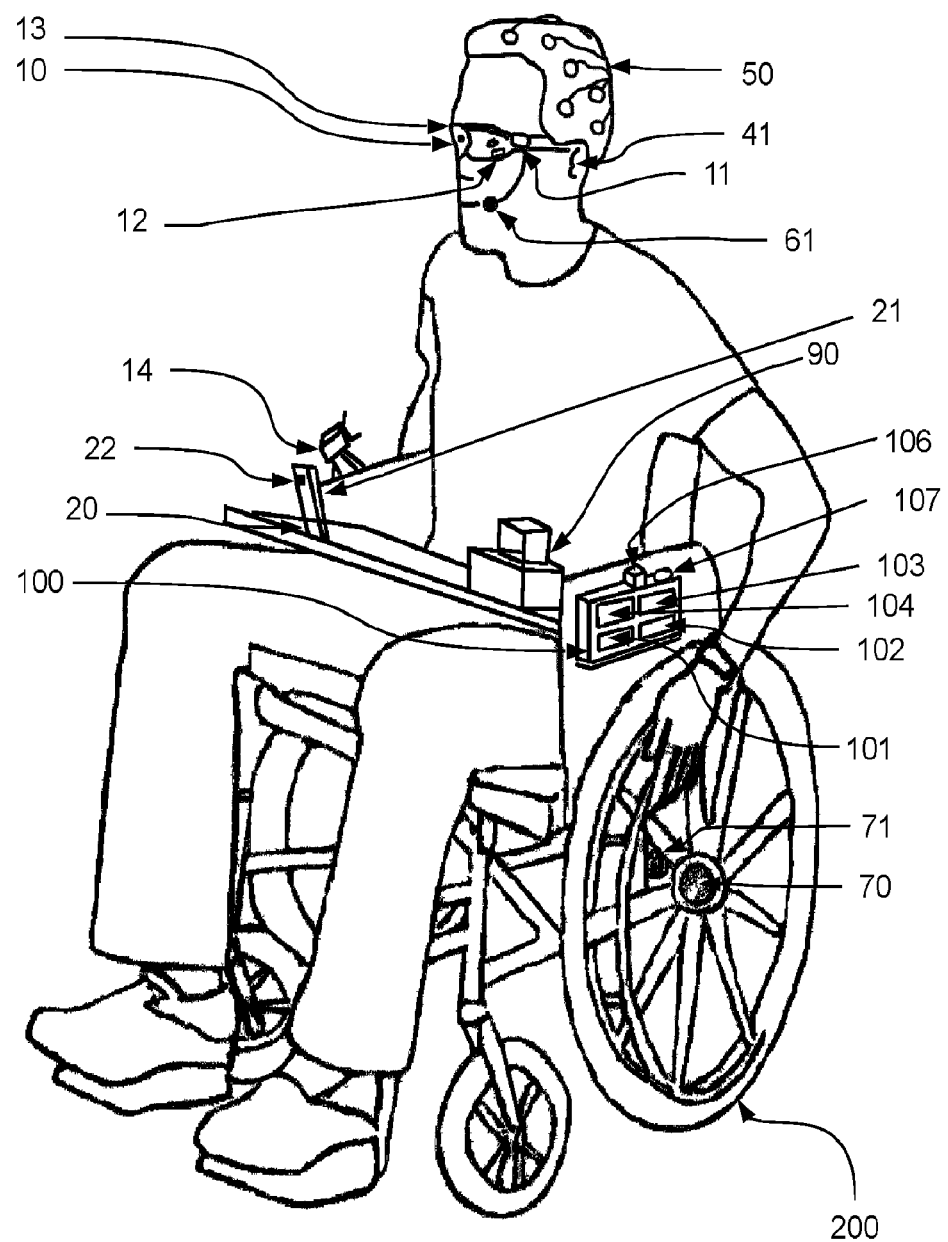
FIG. 9 shows the vehicle according to FIG. 8 with position sensor, with remote communication device, with wearable voice input sensor, without vehicle voice input sensor.

FIG. 9 shows another exemplary embodiment according to the invention. In this case, an eighth sensor, a GPS position sensor 106, is arranged on the wheelchair 200 and is designed to output eighth sensor signals, with the sensor signal receiving unit 101 receiving the eighth sensor signals and determining the first control signals ST1 using them.

The position sensor 106 allows a map showing the current position of the wheelchair 200 or wheelchair user to be displayed using the head-up projection of the wearable 10 and on his cell phone 20. The use of a map in conjunction with the displayed destination input selection data allows selection of destinations or objects that cannot be sensed by environment-sensing sensors 13, 22 or the environment-sensing sensor assembly 90. A target is selected by guiding a virtual mouse pointer via eye control in the head-up projection of the wearable 10 or by selection on the cell phone 20.

Based on the destination input from the wheelchair user, the seventh passenger destination input sensor signals are provided to the control signal determination unit 102. Using the map and the eighth sensor signals of the GPS signal-based position sensor 106, a trajectory to the target location or object is determined and corresponding first control signals ST1 are provided.

Thus, the control signal determination unit 102 has the task of calculating a trajectory to the destination, providing suitable first control signals ST1, as well as making adjustments to the trajectory, for example due to the changing environment, during the journey to the destination based on the real-time data from the environment-sensing sensors 13,22 and the environment-sensing sensor assembly 90, and providing adjusted first control signals ST1. After reaching the destination or target object, the wheelchair 200 stops.

As described in the previous exemplary embodiment, the second, third, and fifth sensor signals are used by the control signal determination unit 102 to provide feedback on whether the wheelchair 200 is on the correct path to the destination from the perspective of the wheelchair user. In case of violation of the first or second reliability criteria known from previous exemplary embodiments, the safety mode is adopted.

At any time, the automated control of a selected target object can be interrupted or terminated by manual override by the wheelchair user.

FIG. 9 shows another exemplary embodiment in which a remote communication device 107 for transmitting LTE or 5G signals is also arranged on the wheelchair 200. This is in signal exchange with the control unit 100 and external mobile phone provider devices. In this case, the wearable 10 is also connected to the control unit 100 via an LTE or 5G connection, so that (video) communication can be carried out or images or videos captured by the wearable image sensor 13 can be provided to others in personal messages or via social networks.

Furthermore, in the event of an initiated safety mode, for example due to a detected critical physical condition of the wheelchair user, at least one emergency contact can be contacted automatically. On the one hand, an automated text message is sent. In addition, a video call is started.

FIG. 9 also shows another exemplary embodiment of the wheelchair 200, in which another inertial navigation unit with integrated accelerometers and rate-of-rotation meters and compass, arranged on the wheelchair 200 and designed to output ninth sensor signals, is used as the vehicle dynamics sensor 71. The sensor signal receiving unit 101 receives the ninth sensor signals and determines the first control signals ST1 using them. In particular, this sensor system allows the control of the driving dynamics by feeding back the driving dynamics sensor variables to the control signal determination unit 102 to enable a more precise implementation of the desired control commands compared to a pure control system.

In a further exemplary embodiment, which can be taken from FIG. 9, the image-based front sensor 22 for detecting the face of the wheelchair user is replaced by an image-based vehicle sensor 14, wherein the latter transmits image-based sensor signals to the control signal receiving unit 101 via a connection, e.g. USB connection, and the control signal determination unit 102 uses the image-based sensor signals to determine the first control signals ST1, and the reliability criteria checking unit 103 evaluates whether the first reliability criteria have been met.

At this point it should be pointed out that all parts described above, in particular the individual embodiments and exemplary embodiments, are to be regarded in each case individually—even without features additionally described in the respective context, even if these have not been explicitly identified individually as optional features in the respective context, e.g. by using: in particular, preferably, for example, e.g., optionally, round brackets, etc.—and in combination or any sub-combination as independent designs or further developments of the invention, as defined in particular in the introduction to the description as well as in the claims. Deviations therefrom are possible. Specifically, it should be noted that the word "in particular" or round brackets do not indicate any features that are mandatory in the respective context.

LIST OF REFERENCE SIGNS

10 Computer system that can be worn on the body (wearable)
11 An inertial navigation unit
12 Eye feature detection unit
13 Wearable image sensor
14 Image-based vehicle sensor
20 Cell phone
21 Image-based front sensor
22 Image-based rear sensor
40 Wearable vitality data sensor
41 Ear vitality data sensor
50 Brain control unit interface or input device
60 Vehicle voice input sensor
61 Wearable voice input sensor
70 Vehicle actuators
71 Vehicle dynamics sensors
80 Device for navigation and/or guiding the path and/or stabilizing a vehicle 90 Environment-sensing sensor assembly
100 Control unit
101 Sensor signal receiving unit
102 Control signal determination unit
103 Reliability criteria checking unit
104 Control signal output unit
106 Position sensor
107 Remote communication device
200 Vehicle, in particular wheelchair
ST1 First control signals
ST2 Second control signals
S1 First sensor signals
S2 Second sensor signals

The invention claimed is:

1. A device for navigating and/or guiding the path and/or stabilizing a vehicle, the device comprising:
   at least one first sensor including an inertial navigation unit, which is designed and arranged to detect at least one first body part, including an absolute position and/or position and/or rotation and/or translation, of a passenger of the vehicle and to output first sensor signals;
   at least one second sensor including an image-based sensor, which is designed and arranged to detect at least the first body part of the passenger and/or their features, including their absolute position and/or position and/or rotation and/or translation, and to output second sensor signals; and
   a control unit designed to,
   a) receive the first and second sensor signals;
   b) determine first control signals for controlling the vehicle based at least on the first sensor signals;
   c) determine whether the first control signals meet at least first reliability criteria based at least on the second sensor signals; and
   d) adopt a safety mode if the control unit determines that the first control signals do not meet at least the first reliability criteria;
   wherein the first body part is the passenger's head and the control unit determines basic data on the basis of geometric dimensions and/or size ratios and/or features of the face and/or gestures detected by at least the second sensor; and
   the first reliability criteria are determined using the basic data.

2. The device according to claim 1, characterized in that the control unit is further designed to determine the first control signals using at least the second sensor signals; and
   e) to adopt the safety mode when the control unit determines that the first control signals do not meet at least the first and/or second reliability criteria, wherein the first and/or second reliability criteria are determined by accuracy and/or reliability analysis of at least the first sensor signals and the second sensor signals.

3. The device according to claim 1, characterized in that the control unit determines the fulfillment of the first reliability criteria by implementing machine learning, comprising classification, or by implementing a neural network.

4. The device according to claim 1, characterized in that the second and/or a third sensor comprising a vitality data sensor, is arranged on a body part or between two body parts and detects vitality parameters as characterizing features and outputs second and/or third sensor signals, wherein the control unit receives the second and/or third sensor signals and, if a vitality parameter value range is not met by the second and/or third sensor signals, the second reliability criteria are not met.

5. The device according to claim 1, characterized in that at least one first sensor assembly comprising an ultrasonic sensor assembly and/or a LIDAR sensor assembly and/or an image-based sensor assembly and/or a RADAR sensor assembly, is mounted on the vehicle for sensing the environment and is designed to output first sensor assembly signals, wherein the control unit receives the first sensor assembly signals and determines the first control signals using the first sensor assembly signals.

6. The device according to claim 1, characterized in that a remote communication device is arranged on the vehicle and is designed to perform signal exchange with the control unit and mobile provider devices for performing video communication and/or remote health condition monitoring of the passenger.

7. The device according to claim 1, characterized in that the first and/or a fourth sensor is mounted on or in a wearable and is designed to detect the first and/or a second body part or their features of the passenger of the vehicle and to output first or fourth sensor signals, wherein, by using said first or fourth sensor signals, the first control signals for controlling the vehicle are determined.

8. The device according to claim 1, characterized in that the first and/or a fifth sensor comprising a brain control unit interface or input device is arranged on and/or in the head of the passenger and is designed to output first or fifth sensor signals, wherein, by using said first or fifth sensor signals, the first control signals for controlling the vehicle are determined.

9. The device according to claim 1, characterized in that the first and/or a sixth sensor comprising a speech input sensor is designed to output first and/or sixth sensor signals, wherein the control unit receives the first and/or sixth sensor signals and, by using said first and/or sixth sensor signals, determines the first control signals for controlling the vehicle.

10. The device according to claim 9, characterized in that the control unit is designed to use an implementation of neural networks, when processing the first and/or sixth sensor signals for determining the first control signals for controlling the vehicle.

11. The device according to claim 1, characterized in that the wearable and/or a smartphone is designed and arranged to output seventh sensor signals comprising passenger destination input sensor signals, wherein the control unit transmits available destination input selection data to the wearable and/or the smartphone for passenger destination input as well as receives the seventh sensor signals and, by using said seventh senor signals, determines the first control signals.

12. The device according to claim 1, characterized in that an eighth sensor comprising a position sensor or a sensor for locating inside buildings, is arranged and designed to output eighth sensor signals, wherein the control unit receives the eighth sensor signals and, by using said eighth sensor signals, determines the first control signals.

13. The device according to claim 1, characterized in that vehicle dynamics sensors, are arranged on the vehicle are designed to output ninth sensor signals, wherein the control unit receives the ninth sensor signals and, by using said ninth sensor signals, determines the first control signals.

14. A vehicle, comprising:
    a device including;
    at least one first sensor including an inertial navigation which is designed and arranged to detect at least one first body part, including an absolute position and/or position and/or rotation and/or translation, of a passenger of the vehicle and to output first sensor signals;
at least one second sensor including an image-based sensor which is designed and arranged to detect at least the first body part of the passenger and/or their features, including their absolute position and/or position and/or rotation and/or translation, and to output second sensor signals; and
a control unit designed to;
(a) receive the first and second sensor signals;
(b) determine first control signals for controlling the vehicle based at least on the first sensor signals;
(c) determine whether the first control signals meet at least first reliability criteria based at least on the second sensor signals; and
(d) adopt a safety mode if the control unit determines that the first control signals do not meet at least the first reliability criteria; and one or more vehicle actuators including controllable motors, arranged to drive the vehicle and designed to receive and process the control signals of the device;
wherein the first body part is the passenger's head and the control unit determines basic data on the basis of geometric dimensions and/or size ratios and/or features of the face and/or gestures detected by at least the second sensor; and
the first reliability criteria are determined using the basic data.

15. A method for controlling a device for navigating and/or guiding the path and/or stabilizing a vehicle comprising:
a) receiving at least first sensor signals comprising inertial navigation-based sensor signals, which describe at least the passenger's head, including its absolute position and/or position and/or rotation and/or translation, of a passenger of the vehicle; and
b) receiving second sensor signals comprising an image-based front sensor, which is designed and arranged to describe at least the first body part or its characterizing features, including their absolute position and/or position and/or rotation and/or translation, of the passenger of the vehicle;
c) determining basic data on the basis of geometric dimensions and/or size ratios and/or features of the face and/or gestures detected by at least the second sensor;
d) determining first control signals for controlling the vehicle based at least on the first sensor signals;
e) determining, via a control unit, whether the first control signals meet at least first reliability criteria based on at least the second sensor signals; and
f) adopting a safety mode when the control unit determines that the control signals do not meet at least the first reliability criteria;
wherein the first reliability criteria are determined using the basic data.

16. The method according to claim 15, characterized in that, based on evaluation of the second and/or third sensor signals comprising vitality parameters of the passenger, the second reliability criterion is not met if a vitality parameter value range is violated.

17. The method according to claim 15, characterized in that first control signals for controlling the vehicle are determined based on evaluation of the first and/or fourth sensor signals, comprising an eye feature detection unit or inertial navigation data-based sensor signals.

18. The method according to claim 15, characterized in that the first control signals for controlling the vehicle are determined based on evaluation of first sensor assembly signals of at least one environment-sensing sensor assembly and/or eighth sensor signals of a position sensor using passenger destination input sensor signals.

19. The method of claim 18, wherein the at least one environment-sensing sensor assembly includes one or more of an ultrasonic sensor assembly, a LIDAR sensor assembly, an image-based sensor assembly or a RADAR sensor assembly.

* * * * *